United States Patent
Blanchflower et al.

(10) Patent No.: US 9,323,767 B2
(45) Date of Patent: Apr. 26, 2016

(54) PERFORMANCE AND SCALABILITY IN AN INTELLIGENT DATA OPERATING LAYER SYSTEM

(71) Applicant: Longsand Limited, Cambridge (GB)

(72) Inventors: Sean Mark Blanchflower, Cambridge (GB); Darren John Gallagher, Cambridge (GB)

(73) Assignee: Longsand Limited, Cambridge (GB)

( * ) Notice: Subject to any disclaimer, the term of this patent is extended or adjusted under 35 U.S.C. 154(b) by 0 days.

(21) Appl. No.: 13/632,825

(22) Filed: Oct. 1, 2012

(65) Prior Publication Data

US 2014/0095505 A1  Apr. 3, 2014

(51) Int. Cl.
*G06F 17/30* (2006.01)

(52) U.S. Cl.
CPC .... *G06F 17/30094* (2013.01); *G06F 17/30011* (2013.01)

(58) Field of Classification Search
CPC .............. G06F 17/30011; G06F 17/30094; G06F 17/30705
USPC ............... 707/655, 659, 728, 731, 737, 830
See application file for complete search history.

(56) References Cited

U.S. PATENT DOCUMENTS

| | | | |
|---|---|---|---|
| 5,140,677 A | 8/1992 | Fleming et al. | |
| 5,418,951 A | 5/1995 | Damashek | |
| 5,649,192 A | 7/1997 | Stucky | |
| 5,675,819 A | 10/1997 | Schuetze | |
| 5,734,916 A | 3/1998 | Greenfield et al. | |
| 5,799,268 A | 8/1998 | Boguraev | |
| 5,806,065 A * | 9/1998 | Lomet | 707/610 |
| 5,842,009 A | 11/1998 | Borovoy et al. | |
| 5,873,107 A | 2/1999 | Borovoy et al. | |
| 5,974,412 A | 10/1999 | Hazlehurst et al. | |
| 5,983,216 A | 11/1999 | Kirsch et al. | |
| 6,006,221 A | 12/1999 | Liddy et al. | |
| 6,026,409 A | 2/2000 | Blumenthal | |
| 6,055,569 A | 4/2000 | O'Brien et al. | |
| 6,078,914 A | 6/2000 | Redfern | |
| 6,122,647 A | 9/2000 | Horowitz et al. | |
| 6,137,911 A | 10/2000 | Zhilyaev | |
| 6,233,571 B1 * | 5/2001 | Egger et al. | 707/999.002 |
| 6,243,708 B1 | 6/2001 | deVries et al. | |
| 6,286,006 B1 * | 9/2001 | Bharat et al. | 1/1 |

(Continued)

OTHER PUBLICATIONS

"Performance and Scalability White Paper", Autonomy Corporation plc, 14 pages.

(Continued)

*Primary Examiner* — Pierre Vital
*Assistant Examiner* — Nargis Sultana

(57) ABSTRACT

Systems and methods that allow for an intelligence platform for distributed processing of big data sets including both structured and unstructured data types across two or more intelligent data operation engine servers. The intelligent data operation engine servers can form a conceptual understanding of content in each electronic file and then cooperates with a distributed index handler to index the conceptual understanding of the electronic file. A query pipeline and the distributed index handler in the intelligence platform cooperate with the two or more intelligent data operation engine servers to improve scalability and performance on the big data sets containing both structured and un-structured electronic files represented in the common index.

20 Claims, 8 Drawing Sheets

(56) References Cited

U.S. PATENT DOCUMENTS

| | | | |
|---|---|---|---|
| 6,295,543 B1 | 9/2001 | Block et al. | |
| 6,327,590 B1 | 12/2001 | Chidlovskii et al. | |
| 6,336,124 B1 | 1/2002 | Alam et al. | |
| 6,356,899 B1 | 3/2002 | Chakrabarti et al. | |
| 6,397,211 B1 | 5/2002 | Cooper | |
| 6,438,539 B1 | 8/2002 | Korolev et al. | |
| 6,477,524 B1 | 11/2002 | Taskiran et al. | |
| 6,480,837 B1 | 11/2002 | Dutta | |
| 6,480,843 B2 | 11/2002 | Li | |
| 6,493,711 B1 | 12/2002 | Jeffrey | |
| 6,505,191 B1* | 1/2003 | Baclawski | 1/1 |
| 6,510,434 B1 | 1/2003 | Anderson et al. | |
| 6,513,031 B1 | 1/2003 | Fries et al. | |
| 6,513,036 B2 | 1/2003 | Fruensgaard et al. | |
| 6,516,308 B1 | 2/2003 | Cohen | |
| 6,523,026 B1 | 2/2003 | Gillis | |
| 6,535,896 B2 | 3/2003 | Britton et al. | |
| 6,560,590 B1 | 5/2003 | Shwe et al. | |
| 6,560,600 B1 | 5/2003 | Broder | |
| 6,584,468 B1 | 6/2003 | Gabriel et al. | |
| 6,592,627 B1 | 7/2003 | Agrawal et al. | |
| 6,601,075 B1 | 7/2003 | Huang et al. | |
| 6,611,825 B1 | 8/2003 | Billheimer et al. | |
| 6,618,727 B1 | 9/2003 | Wheeler et al. | |
| 6,631,367 B2 | 10/2003 | Teng et al. | |
| 6,635,088 B1 | 10/2003 | Hind et al. | |
| 6,635,089 B1 | 10/2003 | Burkett et al. | |
| 6,651,219 B1 | 11/2003 | Elliott | |
| 6,654,735 B1 | 11/2003 | Eichstaedt et al. | |
| 6,654,754 B1 | 11/2003 | Knauft et al. | |
| 6,657,350 B2 | 12/2003 | Kimura et al. | |
| 6,658,623 B1 | 12/2003 | Schilit et al. | |
| 6,665,661 B1 | 12/2003 | Crow et al. | |
| 6,668,256 B1* | 12/2003 | Lynch | 1/1 |
| 6,675,353 B1 | 1/2004 | Friedman | |
| 6,675,354 B1 | 1/2004 | Claussen et al. | |
| 6,718,324 B2 | 4/2004 | Edlund et al. | |
| 6,732,102 B1 | 5/2004 | Khandekar | |
| 6,738,798 B1 | 5/2004 | Ploetz et al. | |
| 6,804,662 B1 | 10/2004 | Annau et al. | |
| 6,848,078 B1 | 1/2005 | Birsan et al. | |
| 6,985,898 B1 | 1/2006 | Ripley et al. | |
| 7,031,961 B2 | 4/2006 | Pitkow et al. | |
| 7,155,489 B1 | 12/2006 | Heilbron et al. | |
| 7,272,594 B1* | 9/2007 | Lynch et al. | 1/1 |
| 7,512,900 B2 | 3/2009 | Lynch et al. | |
| 7,650,331 B1* | 1/2010 | Dean et al. | 712/203 |
| 7,949,654 B2* | 5/2011 | Das et al. | 707/718 |
| 8,005,858 B1 | 8/2011 | Lynch et al. | |
| 8,335,778 B2* | 12/2012 | Ghosh et al. | 707/708 |
| 8,447,329 B2* | 5/2013 | Kadirkamanathan et al. | 455/456.1 |
| 8,479,071 B2* | 7/2013 | Takaku | 714/746 |
| 8,488,011 B2* | 7/2013 | Blanchflower et al. | 348/211.3 |
| 8,493,353 B2* | 7/2013 | Blanchflower et al. | 345/173 |
| 8,516,112 B2* | 8/2013 | Moehler et al. | 709/224 |
| 2001/0020238 A1 | 9/2001 | Tsuda | |
| 2001/0032217 A1 | 10/2001 | Huang | |
| 2001/0037332 A1 | 11/2001 | Miller et al. | |
| 2001/0037345 A1 | 11/2001 | Kiernan et al. | |
| 2001/0051948 A1 | 12/2001 | Srinivasan et al. | |
| 2002/0002483 A1 | 1/2002 | Siegel et al. | |
| 2002/0002607 A1* | 1/2002 | Ludovici et al. | 709/223 |
| 2002/0052898 A1 | 5/2002 | Schilit et al. | |
| 2002/0129014 A1 | 9/2002 | Kim et al. | |
| 2002/0156760 A1 | 10/2002 | Lawrence et al. | |
| 2003/0028512 A1 | 2/2003 | Stensmo | |
| 2003/0079185 A1 | 4/2003 | Katariya et al. | |
| 2003/0084040 A1 | 5/2003 | Jeffrey | |
| 2003/0167266 A1 | 9/2003 | Saldanha et al. | |
| 2003/0177112 A1* | 9/2003 | Gardner | 707/3 |
| 2005/0177805 A1 | 8/2005 | Lynch et al. | |
| 2008/0086436 A1* | 4/2008 | Zhao et al. | 706/12 |
| 2008/0114724 A1* | 5/2008 | Indeck et al. | 707/2 |
| 2008/0155369 A1* | 6/2008 | Takaku | 714/746 |
| 2008/0201318 A1* | 8/2008 | McNew | 707/5 |
| 2009/0024942 A1* | 1/2009 | Pendergast et al. | 715/764 |
| 2009/0157666 A1* | 6/2009 | Gehrke et al. | 707/5 |
| 2012/0191980 A1* | 7/2012 | Kennedy et al. | 713/183 |
| 2012/0200743 A1* | 8/2012 | Blanchflower et al. | 348/239 |
| 2012/0201472 A1* | 8/2012 | Blanchflower et al. | 382/224 |
| 2012/0202514 A1* | 8/2012 | Kadirkamanathan et al. | 455/456.1 |
| 2012/0265806 A1* | 10/2012 | Blanchflower et al. | 709/204 |
| 2012/0290558 A1* | 11/2012 | Gruber | 707/711 |
| 2012/0310820 A1* | 12/2012 | Carter | 705/39 |
| 2012/0317155 A1* | 12/2012 | Ogasawara et al. | 707/812 |
| 2012/0323920 A1* | 12/2012 | Alba et al. | 707/739 |
| 2013/0024467 A1* | 1/2013 | Miller | 707/756 |
| 2013/0332478 A1* | 12/2013 | Bornea et al. | 707/763 |

OTHER PUBLICATIONS

"Big Data", Wikipedia, downloaded from http://en.wikipedia.org/wiki/Big_data on Jun. 27, 2012, 5 pages.

UK Intellectual Property Office, Appeals Decision Whether patent application No. GB0402956.7 complies with section 1(2) dated Nov. 7, 2007, 5 pages.

UK Intellectual Property Office, Draft Judgment from the High Court of Justice Chancery Division Patents Court, Patent application No. GB0402956.7, dated Feb. 6, 2008, 24 pages.

UK Intellectual Property Office, Abbreviated Examination Report, Patent application No. GB0402956.7, dated Oct. 24, 2006, 2 pages.

UK Intellectual Property Office, Examination Report, Patent application No. GB0402956.7, dated Mar. 6, 2007, 3 pages.

Taylor, Richard, "Patently Obvious? Getting Protective Over Software", Portfolio Media, Inc., http://ip.law360.com/Secure/printview.aspx?id=58479, Jun. 5, 2008, 2 pages.

Xue, Q., et al., "Analysis of the Hidden Units of the Multi-Layer Preceptron and its Application in Acoustic-to-Articulatory Mapping," Proc. ICASSP90, Apr. 1990.

"Yahoo! Search," Available from <http://web.archive.org/web/19961128070718/www8.yahoo.com/search.html>, Nov. 28, 1996.

Great Britain Patents Act 1977: Search Report under Section 17, Application No. GB0402956.7, Date of Search Jun. 4, 2004, Examiner Jake Collins, pp. 2 total.

Anhai Doan et al., Reconciling Schemas of Disparate Data Sources: A Machine-Learning Approach, ACM SIGMOD Record, Proceedings of the 2001 AC, SIGMOD International Conference on Management of Data SIGMOD '01, vol. 30 Issue 2, May 21-24, 2001.

Autonomy, About Autonomy, Aug. 2001, pp. 1-2 http://www.autonomy.com/autonomy_v3Widgets/Prints/Print.pxml.

Autonomy—Adding Intelligence to the XML, Nov. 2000, pp. 1-3. http://www.autonomy.com/autonomy/dynamic/autopage466.html.

Autonomy, Adding Intelligence to XML, Aug. 2001, pp. 1-3 http://www.autonomy.com/autonomy_v3Widgets/Prints/Print.pxml.

"Autonomy Delivers Agentware i3™ Product Line," Palo Alto, CA., Aug. 5, 1997.

"Autonomy Enables Butterworths," Feb. 8, 1999.

"Autonomy First to Fully Automate XML Tagging," Jun. 2, 1998.

Autonomy, First to Fully Automate XML Tagging, Jun. 1998, pp. 1-2. http://www.autonomy.com/autonomy/dynamic/autopage150.shtml.

"Autonomy Helps Vignette Customers Quickly Reap the Benefits of Internet Relationship Management," Jan. 4, 1999.

Autonomy, Intellectual Foundations, Aug. 2001, pp. 1-2 http://www.autonomy.com/autonomy_v3Widgets/Prints/Print.pxml.

Autonomy, Kenjin, Bring autonomy's technology to your PC, Mar. 2001 http://www.autonomy.com/autonomy/dynamic/autopage203.shtml.

"Autonomy Launches Portal-In-A-Box™ Eliminates Need for Costly Manual Labor in Creating and Maintaining Portal Sites," Feb. 1, 1999.

Autonomy, Limitations of Other Approaches, Aug. 2001, pp. 1-2 http://www.autonomy.com/autonomy_v3Widgets/Prints/Print.pxml.

Autonomy, Solutions Landing Page, Feb. 2001, pp. 1-2 http://www.autonomy.com.autonomy/dynamic/autopage442.shtml.

(56) References Cited

OTHER PUBLICATIONS

Autonomy, Technology, Aug. 2001, pp. 1-2 http://www.autonomy.com/autonomy_v3Widgets/Prints/Print.pxml.
Autonomy, Technology Benefits, Aug. 2001, p. 1 http://www.autonomy.com/autonomy_v3Widgets/Prints/Print.pxml.
"Autonomy Technology Helps Leading Network Services Company to Create Online 'Brain Trusts'," Aug. 24, 1999.
Autonomy, Technology White Paper, Sep. 1997, pp. 1-19. www.autonomy.com.
Autonomy, Technology White Paper, Aug. 2001, pp. 1-19.
"Autonomy Unveils New Platform for Applications Using Unstructured Data," Jan. 25, 2000, 3 pages.
Autonomy, XML White Paper, Aug. 2001, pp. 1-11.
"Caredata.com Licences Autonomy Technology for Citeline Web Research Tools," Dec. 14, 1999.
Crouch, C., et al., "Experiments in Automatic Statistical Thesaurus Construction", Jun. 1992 pp. 77-88.
Fortier, Paul, "SQL-3 Implementing the Object-Relational Database," 1999, McGraw-Hill, pp. 17-37.
Haykin, S., *Adaptive Filter Theory*, Englewood Cliffs, N.J.: Prentice-Hall, 1986, Chapters 5 and 8.
Ivankhnenko, A.. "Heuristic Self-Organization in Problems of Engineering Cybernetics Automatica," vol. 6, Mar. 1970, pp. 207-219.
Klema, V., et al., "The Singular Valve Decomposition: Its Computation and Some Applications," IEEE Trans. AC, vol. AC-25, No. 2, Apr. 1980, pp. 164-176.
M.R. Lynch, P.J. Rayner and S.B. Holden, ICASSP 91 vol. 3 D, Digital Signal Processing, Removal of Degeneracy in Adaptive Volterra Networks by Dynamic Structuring, May 14-17, 1991, pp. 2069-2072.
P.J. Rayner and M.R. Lynch, ICASSP 90 vol. 2 $S_2$ VA, Speech Processing 2 VLSI Audio and Electroacoustics, Complexity Reduction in Volterra Connectionist Modelling by Consideration of Output Mapping, Apr. 3-6, 1990, pp. 885-888.
Powell, M.J.D., Radial Basis Function Approximations to Polynomials, Proc. Department of Applied Mathematics and Theoretical Physics, *Numerical Analysis*, 1987.
Rayner, P. et al.., "A New Connectionist Model Based on a Non-Linear Adaptive Filer Process," ICASSP89, Apr. 1989.
Schetzen, Martin, *The Volterra and Weiner Theories of Non-Linear Systems*, New York, New York: John Wiley, 1980, Chapter 5.
WebMethods B2B v3.0, "Whitepaper," Oct. 1999, pp. 1-17.
Primus White Paper, "Providing a Superior User Experience with Web Self-Service," Sep. 2001, 29 pages.
Leyden, John, "Free Tool Threatens Search Engines," http://news.com.com/2100-1008-5110910.html?tag+sas_email, Nov. 24, 2003, 8 pages.
Kenjin product datasheet by Autonomy, Jan. 2001, 2 pages.
Wilby, Dave, "Kenjin," Internet Magazine, Jun. 2000, 2 pages.
Notice of Allowance mailed Jul. 2, 2007, U.S. Appl. No. 09/872,938 titled "Method and Apparatus to Link to a Related Document", filed May 31, 2001, Applicants: Michael R. Lynch, et al., 18 pages.
Issue Notification mailed Aug. 29, 2007, U.S. Appl. No. 09/872,938 titled "Method and Apparatus to Link to a Related Document", filed May 31, 2001, Applicants: Michael R. Lynch, et al., 1 page.
Non-Final Office Action mailed Jan. 22, 2007, U.S. Appl. No. 09/872,938 titled "Method and Apparatus to Link to a Related Document", filed May 31, 2001, Applicants: Michael R. Lynch, et al., 21 pages.
Non-Final Office Action mailed Aug. 10, 2006, U.S. Appl. No. 09/872,938 titled "Method and Apparatus to Link to a Related Document", filed May 31, 2001, Applicants: Michael R. Lynch, et al., 16 pages.
Non-Final Office Action mailed Jul. 26, 2005, U.S. Appl. No. 09/872,938 titled "Method and Apparatus to Link to a Related Document", filed May 31, 2001, Applicants: Michael R. Lynch, et al., 18 pages.
Non-Final Office Action mailed Feb. 12, 2004, U.S. Appl. No. 09/872,938 titled "Method and Apparatus to Link to a Related Document", filed May 31, 2001, Applicants: Michael R. Lynch, et al., 17 pages.
Final Office Action mailed Jan. 20, 2006, U.S. Appl. No. 09/872,938 titled "Method and Apparatus to Link to a Related Document", filed May 31, 2001, Applicants: Michael R. Lynch, et al., 20 pages.
Final Office Action mailed Jan. 11, 2005, U.S. Appl. No. 09/872,938 titled "Method and Apparatus to Link to a Related Document", filed May 31, 2001, Applicants: Michael R. Lynch, et al., 19 pages.
Advisory Action mailed May 2, 2007, U.S. Appl. No. 09/872,938 titled "Method and Apparatus to Link to a Related Document", filed May 31, 2001, Applicants: Michael R. Lynch, et al., 2 pages.
Advisory Action mailed May 23, 2005, U.S. Appl. No. 09/872,938 titled "Method and Apparatus to Link to a Related Document", filed May 31, 2001, Applicants: Michael R. Lynch, et al., 3 pages.
Issue Notification mailed Aug. 3, 2011, U.S. Appl. No. 11/855,127 titled "Methods and Apparatus to Link to a Related Document", filed Sep. 13, 2007, Applicants: Michael R. Lynch, et al., 1 page.
Notice of Allowance mailed May 20, 2011, U.S. Appl. No. 11/855,127 titled "Methods and Apparatus to Link to a Related Document", filed Sep. 13, 2007, Applicants: Michael R. Lynch, et al., 10 pages.
Non-Final Office Action mailed Apr. 28, 2010, U.S. Appl. No. 11/855,127 titled "Methods and Apparatus to Link to a Related Document", filed Sep. 13, 2007, Applicants: Michael R. Lynch, et al., 19 pages.
Final Office Action mailed Nov. 8, 2010, U.S. Appl. No. 11/855,127 titled "Methods and Apparatus to Link to a Related Document", filed Sep. 13, 2007, Applicants: Michael R. Lynch, et al., 11 pages.
Notice of Allowance mailed Aug. 29, 2008, U.S. Appl. No. 10/901,585 titled "Methods and Apparatuses to Generate Links From Content in an Active Window" filed Jul. 28, 2004, Applicants: Michael R. Lynch, et al., 20 pages.
Issue Notification mailed Mar. 11, 2009, U.S. Appl. No. 10/901,585 titled "Methods and Apparatuses to Generate Links From Content in an Active Window" filed Jul. 28, 2004, Applicants: Michael R. Lynch, et al., 1 page.
Non-Final Office Action mailed Aug. 10, 2007, U.S. Appl. No. 10/901,585 titled "Methods and Apparatuses to Generate Links From Content in an Active Window" filed Jul. 28, 2004, Applicants: Michael R. Lynch, et al., 23 pages.
Final Office Action mailed Feb. 28, 2008, U.S. Appl. No. 10/901,585 titled "Methods and Apparatuses to Generate Links From Content in an Active Window" filed Jul. 28, 2004, Applicants: Michael R. Lynch, et al., 40 pages.
Third Examination Report mailed Jul. 26, 2007, GB Patent Application No. 0402956.7, "Methods and Apparatuses to Generate Links From Content in an Active Window", Applicants: Autonomy Corporation, Ltd., 3 pages.
Kanellos, Michael "Microsoft Aims for Search on Its Own Terms", 8 pages. Downloaded from http://news.com.com/2100-1008-5110910.html?tag=sas_email on Dec. 12, 2003.
"Feature: New Search for Autonomy The Death of Search Engines" dated Mar. 27, 2000, 2 pages, downloaded Aug. 2, 2007 from http://64.233.169.104.search?q=cache:liqstQofDEAUJ:www.e-consultancy.com/news-blog/4479/new-search.

\* cited by examiner

PERFORMANCE AND SCALABILITY IN AN INTELLIGENT DATA OPERATING LAYER SYSTEM

BACKGROUND

Big data technologies describe a new generation of technologies and architectures designed to economically extract value from very large volumes of a wide variety of data by, for example, enabling high-velocity capture, discovery, and/or analysis. In short, big data technology can help to extract value from the digital universe. Big data comes in one size: large. Systems that attempt to process such amounts of data will be awash with data, easily amassing terabytes and even petabytes of information. In information technology, the big data sets are so large and complex that they become awkward to process using relational databases and standard management tools.

BRIEF DESCRIPTION OF THE DRAWINGS

The multiple drawings refer to embodiments of the disclosure. While embodiments of the disclosure described herein are subject to various modifications and alternative forms, specific embodiments thereof have been shown by way of example in the drawings and will herein be described in detail.

DETAILED DESCRIPTION

Figure 1:
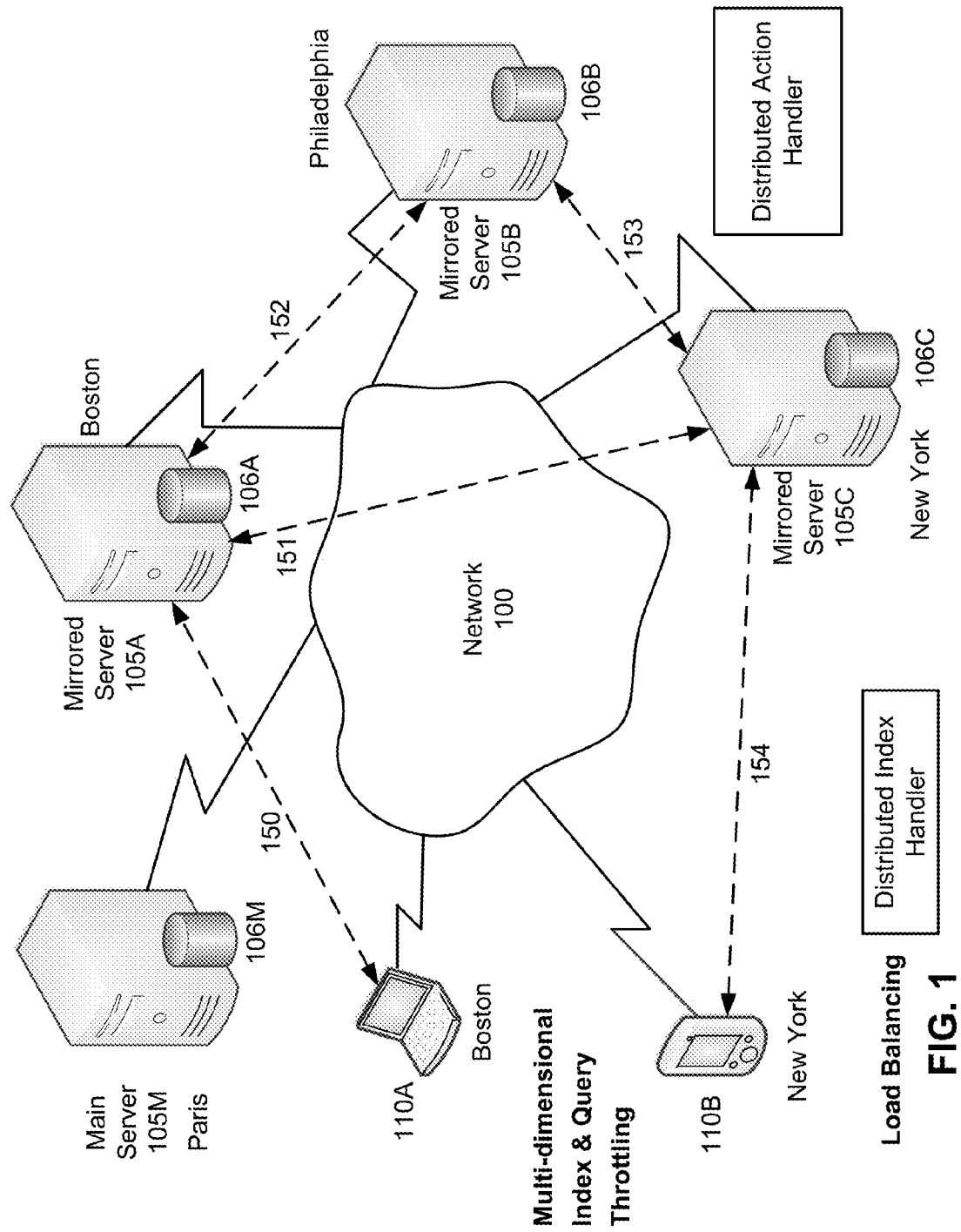
FIG. 1 illustrates an example of a network diagram of an embodiment of an intelligence platform for processing big data sets of unstructured data as well as structured data that includes intelligent data operation engine servers, one or more distributed index handlers, and one or more instances of action handlers.

In the following description, numerous specific details are set forth, such as examples of specific data signals, components, connections, etc. in order to provide a thorough understanding of the present disclosure. It will be apparent, however, to one skilled in the art that the present disclosure may be practiced without these specific details. In other instances, well known components or methods have not been described in detail but rather in a block diagram in order to avoid unnecessarily obscuring the present disclosure. Thus, the specific details set forth are merely exemplary. The specific details may be varied from and still be contemplated to be within the spirit and scope of the present disclosure.

In the following description of exemplary embodiments, reference is made to the accompanying drawings that form a part hereof, and in which it is shown by way of illustration specific embodiments in which the disclosure can be practiced. It is to be understood that other embodiments can be used and structural changes can be made without departing from the scope of the embodiments of this disclosure. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof.

In general, systems and methods are discussed that allow for an intelligence platform configured for the processing of a large set of both unstructured data as well as structured data. The intelligence platform includes a series of modular and distributed servers configured for distributed processing of big data sets including both structured and unstructured information types across two or more intelligent data operation engine servers. The intelligence platform further includes two or more similar instances of an intelligent data operation engine server. Each intelligent data operation engine server may be configured to apply automatic advanced analytics, categorization, and clustering to all appropriate types of data including the structured and unstructured data. The intelligent data operation engine servers can form a conceptual understanding of content in electronic files and then cooperate with a distributed index handler to index the conceptual understanding of the electronic file. The intelligence platform further includes an index processing pipeline containing one or more instances of the distributed index handler. Each instance of the distributed index handler is configured to split and index data into the two or more instances of the intelligent data operation engine servers, optimize performance by batching data, replicate all index commands, and invoke dynamic load distribution. The intelligence platform can include a query pipeline with one or more instances of an action handler that allows for the distribution of protocol action commands between the two or more intelligent data operation engine servers. The query pipeline and the index processing pipeline cooperate with the two or more intelligent data operation engine servers to improve scalability and performance on the big sets of data containing both structured and unstructured electronic files.

Overview

On the server side, the servers take advantage of both distributed computing among the set of servers, an intelligence engine contextually making a nexus between various concepts, and mirroring of hardware and content to achieve near real time analyzing of big data sets and being able to take an informed action based on the analysis.

Server Mirroring and Distributed Processing

FIG. 1 illustrates an example of a network diagram of an embodiment of an intelligence platform for processing big data sets of unstructured data as well as structured data that includes intelligent data operation engine servers, one or more distributed index handlers, and one or more instances of action handlers. In this example, one server computer for simplicity represents each server site. However, it should be understood that each server site may include multiple server computers working together collaboratively in a distributed manner as described above. Server computers 105M, 105A, 105B and 105C connected to the network 100 may be configured as intelligent data operating layer servers (intelligent data operation engine servers). The intelligent data operation engine server instances may include a main intelligent data operation engine server 105M and multiple mirrored intelligent data operation engine servers 105A-105C. The main intelligent data operation engine server 105M may mirror its information onto the mirrored intelligent data operation engine servers 105A-105C. The mirroring may include mirroring the content of the main intelligent data operation engine server database 106M into the mirrored intelligent data operation engine server databases 106A-106C. The main intelligent data operation engine server 105M and the mirrored intelligent data operation engine servers 105A-105C may be located or distributed in various geographical locations to serve the enterprise facilities in these areas. For example, the main intelligent data operation engine server 105M may be located in Paris, the mirrored intelligent data operation engine server 105A may be located in Boston, 105B in Philadelphia, and 105C in New York. Additionally, multiple instances of the intelligent data operation engine server 105A, 105B, and 105C may be located at the same geographic location with the instances configured to cooperate to speed up query response time and to scale to handle massive data analysis. As discussed, the mirroring of a server computer in one location with another server computer in another location may be understood as the mirroring of a server site with all of its server computers together with associated hardware and content.

The action handler can be used to query a cluster of intelligent data operation engine servers. The action handler distributes action commands amongst the two or more intelligent data operation engine servers, increasing the speed with which actions are executed and saving processing time. The action handler monitors activity of each intelligent data operation engine server and load balances between the two or more intelligent data operation engine servers. The action handler also distributes actions when a lack of feedback from a particular intelligent data operation engine server occurs to ensure uninterrupted service if any of the intelligent data operation engine servers should fail.

The action handler is user configurable to decide which mode it will run in: Mirror mode, and Non-mirror.

Mirror mode: The intelligent data operation engine servers that the action handler distributes command actions in a common protocol to are identical (that is two or more of the intelligent data operation engine servers in a cluster of servers are exact copies of each other, each one is configured the same way and contains the same data).

Non-mirror: The intelligent data operation engine servers that the action handler distributes command actions in a common protocol to are different (that is two or more of intelligent data operation engine servers in the cluster of servers is configured differently and contains different data). When running the action handler in non-mirror mode, the action handler sets up Virtual Databases that can be of the following types: Combinator and Distributor.

Combinator: The Virtual Database forwards an action command to all the databases that it comprises. The action handler collates and sorts the results before the action handler returns them.

Distributor: The Virtual Database forwards an action command to one of the databases it comprises. These databases must be identical (that is all of the databases are exact copies of each other and contain the same data). The way the action handler forwards the action is determined by the distribution method.

The distributed index handler can be used to create the common index for a cluster of intelligent data operation engine servers. The distributed index handler distributes index commands to the two or more intelligent data operation engine servers, so that index commands are executed more quickly and processing time is saved. The distributed index handler also distributes index commands that ensure uninterrupted service when a lack of feedback from a particular intelligent data operation engine server occurs to ensure uninterrupted service if any of the intelligent data operation engine servers should fail. Connectors index into the distributed index handler.

The distributed index handler is user configurable to decide which mode that it will run in: Mirror mode, and Non-mirror.

Mirror mode: The distributed index handler distributes all the index data it receives to all the intelligent data operation engine servers that it is connected to. The intelligent data operation engine servers are exact copies of each other that must all be configured in the same way. At least one intelligent data operation engine server and one instance of the distributed index handler should run in mirror mode if the facility wants to ensure uninterrupted service when one of the intelligent data operation engine servers should fail. While one intelligent data operation engine server is inoperable, data continues to be indexed into its identical copies which at the same time are still available to return data for queries.

Non-Mirror mode: The distributed index handler distributes the index data it receives evenly across the designated intelligent data operation engine servers that it is connected to. For example, if the distributed index handler is connected to four intelligent data operation engine servers, it indexes approximately one quarter of the data into each one of the intelligent data operation engine servers, (note individual documents are not split up). Running the distributed index handler in non-mirror mode assists in instances where servicing an amount of data that is to be indexed is too large for a single intelligent data operation engine server. When the intelligent data operation engine servers that the distributed index handler indexes into are situated on different machines, the index process will require less time.

For some embodiments, a set of two or more intelligent data operation engine servers may work together in a cooperative and distributed manner to do the work of a common query engine. For example, there may be a set of two or more intelligent data operation engine servers in Boston configured to perform the operations of the common query engine. This allows the functionalities of the common query engine amongst the set of server computers to be performed in a faster manner.

The distribution of server computers within a given location or sister location helps to improve the identification and response time to post of relevant electronic files. The mirroring of sites with identical compositions of hardware and content is done to help improve the identification and response time. In addition, the mirroring of identical server site locations aids in servicing potentially millions of computing devices by distributing the workload and limiting the physical transmission distance and associated time. The intelligent data operation engine server set is duplicated with the same content and mirrored across the Internet to distribute this load to multiple identical sites in order to increase both response time and handle the capacity of the queries by those computing devices.

Next, when the intelligent data operation engine server 105A is overloaded, the computing devices 110A at a given enterprise facility may be connected with the intelligent data operation engine server 105C in New York because it may not be overloaded even though the intelligent data operation engine server 105C may be further from the geographic location of the enterprise facility than the intelligent data operation engine server 105A.

For some embodiments, a set of intelligent data operation engine servers may be used to analyze big data stored in repositories and do data operation actions on that information such as respond to queries, give current trends, etc. A hierarchical set of filters may be spread linearly across the set of intelligent data operation engine servers. These intelligent data operation engine servers may work together in collaboration to process the big data information in order to respond to queries, project trending information, etc. For example, the intelligent data operation engine server 105A, the intelligent data operation engine servers 105A-105C may work together to process the information received from the enterprise facility 110A. The communication channel 151 using a common protocol between the intelligent data operation engine servers 105A and 105C, and the communication channel 152 between the intelligent data operation engine server 105A and 105B illustrates this collaboration. Similarly, the intelligent data operation engine servers 105C, 105B, and 105A may work together to process the information received from the enterprise facility 110B. The communication channel 151 between the intelligent data operation engine servers 105C and 105A, and the communication channel 153 between the intelligent data operation engine servers 105C and 105B illustrates this collaboration.

The number of intelligent data operation engine servers installed at a facility generally depends on the number of documents and facility users that the intelligent platform will be required to handle. Generally, one intelligent data operation engine server can comfortably analyze, store, and process queries for a set amount of documents or users. To achieve an optimal query speed or document processing speed a number of servers should be combined to scale together with the use of the action handler and distributed index handler. In addition, it is also useful to install multiple intelligent data operation engine servers so one or more intelligent data operation engine servers can be specifically tweaked for certain categories. Generally, response time is minimized when the data is spread across multiple intelligent data operation engine servers, so that each intelligent data operation engine server stores one subject area, or data that can be separated into data that is used frequently and data that is used infrequently. The facility may store each data group on individual intelligent data operation engine servers to speed up the Dynamic Reasoning Engine's (DRE's) response time.

In an example query process, each server in the set of servers applies filters to eliminate irrelevant stored electronic files and/or find corresponding positive matched electronic files in enterprise facilities 110A, 110B as possible matches to feature sets of known objects in the object database. Entire categories of possible matching objects can be eliminated simultaneously, while subsets even within a single category of possible matching objects can be simultaneously solved for on different servers. Each server may hierarchically rule out potentially known electronic files on each machine to narrow down the hierarchical branch.

The intelligent data operation engine server set contains processing power that can be distributed across the intelligent data operation engine server set, and applied to the intelligent data operating layer databases. The collaboration among the intelligent data operation engine servers may help speed up the data analysis process. For example, each of the intelligent data operation engine servers may apply filters to eliminate a certain pattern of features as possible matches to features of known electronic files stored in the database. Entire categories of electronic files may be eliminated simultaneously, while the collaborating intelligent data operation engine servers may simultaneously identify subsets even within a single category of electronic files as potential matching objects. Further, feedback communication occurs between each intelligent data operation engine server to help hierarchically rule out potential known electronic files to narrow down the hierarchical branch and leaf path to determine whether there is a match.

As discussed, the server computer has a set of one or more databases to store a scalable database of electronic files. The intelligent platform of intelligent data operation engine servers, distributed index handlers, and action handlers described herein enable organizations to understand and process big data set information, structured and unstructured, in near real time. The cooperation between the intelligent platform of intelligent data operation engine servers and distributed index handlers is able to aggregate and index any form of structured, semi-structured and unstructured data into a single index, regardless of where the file resides. Users of traditional systems may be required to sequentially search in four or five repositories to arrive at an acceptable results list, whereas the intelligent platform enables a single point of search for all enterprise information (including rich media), saving organizations time and money. With access to virtually every piece of content, the intelligent platform provides a complete view of an organization's data assets.

In various embodiments, the systems and methods described herein might not use a schema. In some cases, a big data set may not have a schema that will work with all of the data that is stored by a user of the system. This data may have many different formats and may include many different types of files. Accordingly, it can be preferable for the system to function without a predefined schema. In an embodiment, intelligent data operation engine analyzes the content of structured and unstructured data in electronic files, creates conceptual understandings of these electronic files, and creates a search index that resides on a server or sets of servers as an executable application that integrates with the massive parallel processors and multithreaded nature of the hardware in the server. The intelligent data operation engine, action handler, and distributed index handlers may be configured as executable applications or services running alongside other software.

As illustrated in FIG. 1, the servers 106A, 105A-B, can be distributed. For example, in organizations that are geographically distributed, local replicas can be automatically created and utilized where possible. Remote copies may only be used when a local system fails, thereby building fault tolerance whilst maintaining the benefits of local performance and a reduction of resource overhead into a single, seamless service. In other embodiments, documents may be distributed to different parts of the system based on age, subject matter, language, etc.

The system illustrated in FIG. 1 can perform load balancing using a distributed index handler and an action handler. With load balancing, data is automatically replicated across multiple servers and user requests are load-balanced across these replicas, improving performance, reducing latency, and improving user-experience. In some embodiments, a search can be directed to a proper portion of a system based on what is being searched for. For example, in one embodiment more resources may be dedicated to recent news articles because more recent news may generally be of greater interest to many users and, accordingly, it may be important to search these stories more quickly and they may be searched by a greater number of people, perhaps performing a greater number of searches. Conversely, fewer resources might be provided for less recent news stores stored in such a system because fewer searches on those stores might be performed.

The system illustrated in FIG. 1 may also include a multi-dimensional index to provide valuable information to the distribution components. An example intelligent data operation engine server precludes bottlenecks and unbalanced peak loads during the indexing and query process. An embodiment can provide prioritized throttling to preclude bottlenecks and unbalanced peak loads. The prioritized throttling includes factors such as: 1) time to maximize index/query performance based on the time of day (i.e. work hours), 2) location such as prioritizing activity based on the server landscape, and 3) status such as an assigned priority status for processing.

An intelligent data operation engine server is configured to apply automatic advanced analytics, categorization, and clustering to all types of data including structured and unstructured data, which enables organizations to reduce costs and risks, and collect server data for any purpose including data analytics, efficient discovery, and legal hold. In an embodiment, the intelligent data operation engine server is configured to perform keyword and conceptual searches; speech analytics; video file, social media content, email and messaging content searches. The intelligent data operation engine server may then categorize all this information, all on the same platform. In an embodiment, an intelligent data operation engine server understands over 1,000 content types from more than 400 repositories in over 150 human languages. Over 500 operations can be performed on digital content by the intelligent data operation engine server, including hyper-linking, clustering, agents, summarization, taxonomy generation, profiling, alerting, and meaning-based search and retrieval. Because intelligent data operation engine server is at the core of an example system's scalable, modular family of product offerings, any product can be seamlessly integrated with any other system.

Similarly, in various embodiments one or more servers 105M, 105A-105C, may include map and reduce integration such that the intelligent data operating layer supports and leverages the Hadoop® ecosystem, combining the strengths of such a system and the intelligent data operating layer for richer analytic computation. Unlike other vendors who simply re-implement Map/Reduce, the intelligent data operating layer can uniquely leverage additional tools in such systems that include technology stack such as Hbase and Hive. Parallel import and export to HDFS allows data transformation to occur in such example systems or the intelligent data operating layer.

The management of structured and unstructured content requires an intelligent data operations platform, such as an intelligent data operating layer, to meet the most rigorous performance requirements and that can also be easily resized or reconfigured commensurate to business needs. An operator of the server system has an option to place the instances of the intelligent data operation engine servers to run in 1) mirroring mode or 2) non-mirroring mode. The operator may place instances of the intelligent data operation engine servers to run in 1) mirroring mode in order to scale to process massive amounts of queries per unit time because the instances are replicated copies of each other and the processing of the queries is load balanced between the replicated instances of the intelligent data operation engine servers. The operator may place instances of the intelligent data operation engine servers to run in 2) non-mirroring mode to process queries with less latency between a query request and a search result response because the instances are 1) configured differently or 2) work on different sets of data causing less latency between the query request and the search result response.

An example system scales to support the large enterprise and portal deployments in the world, with presence in many markets. The intelligent data operating layer server analyzes larger sets of data, such as Big Data, and returns a manageable set of data back to a user. Since the intelligent data operating layer scalability is based on its modular, distributed architecture, the intelligent data operating layer can handle massive amounts of data such as on commodity dual-CPU servers. For instance, only a few hundred entry-level enterprise machines may be needed support a large, i.e. 10 billion record, footprint of big data. The intelligent data operating layer is configured to handle the larger sets of data to create improved performance of the intelligent data operating layer.

In an example embodiment, a single intelligent data operating layer engine can: support an estimated 100 million documents on 32-bit architectures and over 750 million on 64-bit platforms; accurately index in excess of 100 GB/hour with index commit times (i.e. how fast an asset can be queried after it is indexed) of sub 5 ms; execute over 2,500 queries per second, while querying the entire index for relevant information, with sub-second response times on a single machine with two CPUs when used against 50 million pieces of content; support hundreds of thousands of enterprise users, or millions of web users, accessing hundreds of terabytes or even petabytes of data; and save storage space with an overall footprint of less than 10% of the original file size.

This enhanced scalability results in hardware cost-savings as well as the ability to address larger volumes of content. Though the intelligent data operating layer scales extremely well on commodity servers, its flexible architecture can take full advantage of 1) massive parallelism, symmetric multi-processing processing capabilities, 2) software platforms (such as Solaris 10, Linux 64, Win64, etc), 3) distributed server farms, and 4) external disk arrays (i.e. NAS, SAN etc) to further improve their performance. This flexibility extends to being able to leverage individual or a combination of these different environments.

The intelligent data operation engine servers provide a common processing layer that allows an organization to form a conceptual understanding of information, both inside and outside the enterprise. Based on the intelligent data operating layer, the platform uses probabilistic algorithms to automatically recognize concepts and ideas expressed in all forms of information. In an embodiment, the intelligent data operation engine servers leverage NoSQL (Not Only SQL) technology, which enables enterprises to simultaneously understand and act upon electronic documents, emails, video, chat, phone calls, and application data moving across networks, the web, the Cloud, smartphones, tablets, and sensors. With over 500 out-of-the box functions and 400 connectors, the intelligent data operating layer advanced pattern-matching technology understands the meaning of all enterprise information regardless of format, human language, location, subject or quantity and detects patterns, emotions, sentiments, intent, risks, and preferences as they happen. The connectors may extract data from content sources, import the data into an IDX format or XML file formats, and then index the data into the intelligent data operation engine server or servers. A single view into all content allows highly complex analytics to be performed seamlessly across a variety of data types, repositories, and communication channels to dramatically increase the value an organization can derive from its information.

Figure 2:
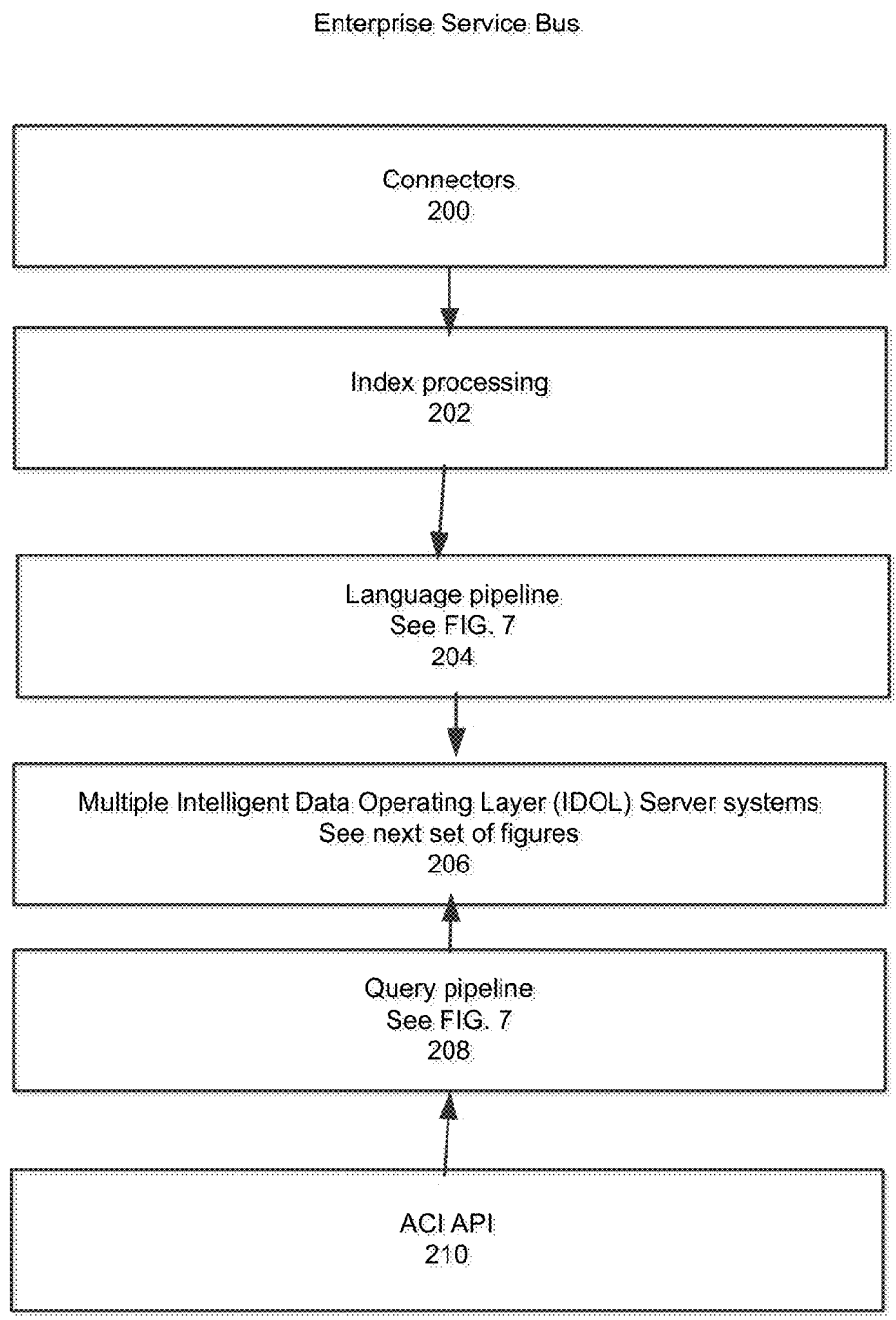
FIG. 2 illustrates an example diagram of an embodiment of an enterprise service bus.

FIG. 1 and FIG. 2 illustrate an intelligence platform for the processing of large set of both unstructured data of all varieties, such as video, audio, social media, email, text, click streams, log files, and web-related content and search results, as well as structured data. Distributed processing of big data sets that include structured and unstructured information types across the clusters of intelligent computing engines utilizes a simple programming model. As illustrated in FIG. 2, content from various repositories of stored electronic files are aggregated by connectors 200 and then using index processing 202, content of stored electronic files is indexed into the intelligent data operation engine server and/or communicated for dissemination across multiple intelligent data operation engine servers 206, through the distributed index handler.

In an embodiment, an intelligent data operating layer is built on adaptive pattern recognition technology and probabilistic modeling to form a conceptual and contextual understanding of the digital content and metadata associated with an electronic file, and then later the conceptual understanding of the contextual understanding is refined by extracting meaning from the manner in which people interact with that electronic file. Meaning based computing refers to the ability to form a conceptual understanding of all information, whether structured, semi-structured or unstructured, and recognize the relationships that exist within it. The conceptual understanding of information allows computers to harness the full richness of human information, bringing meaning to all data, regardless of what data structure that information comes from or what type of storage repository stores that data. Through sophisticated functionality and analytics, meaning based computing automates manual operations in real-time to offer true business value. Meaning based computing extends far beyond traditional methods such as keyword search that simply allow users to find and retrieve data. Keyword search engines, for example, cannot comprehend the meaning of information, so they only find documents in which a specific word occurs. The intelligent data operating layer assigns both mathematical weights and idea distancing positioning in different categories to give an ability to understand information that discusses the same idea (i.e. are relevant) but use semantically different words. Idea distancing shows vital relationship between seemingly separately tagged subjects to increase findability of information. These example systems also may use statistical probability modeling that is refined over time of operation of the engine to calculate the probabilistic relationships between terms and phrases. The model of the conceptual understanding then improves over time to be a more accurate view of the conceptual meaning of a document based by applying each new use of that conceptual understanding to affect the weighted values on the stored data.

One example of this theory at work is the intelligent platform's agent profile technology. Users can create agents to automatically track the latest information related to their interests, and the intelligent data operating layer determines the relevance of a document based on the model of the agent. Adaptive Probabilistic Concept Modeling (APCM) algorithms are also used to analyze, sort and cross-reference unstructured information. In a similar manner, knowledge about the documents deemed relevant by a user to an agent's profile can be used in judging the relevance of future documents.

While some other models start off with an a priori knowledge of the state of the system and apply training to it, the intelligent platform begins with a blank slate and allows incoming data to dictate the model. In true Bayesian fashion, the model mixes new information with a growing body of older content to refine and retrain the engine. Shannon's Information Theory uses a mathematical foundation for information to be treated as a quantifiable value in communications. The intelligent data operating layer uses Shannon's Information Theory on human languages, which contain a high degree of redundancy or nonessential content. In an embodiment, an intelligent data operating layer also uses Shannon's Information Theory to ensure that the terms with weighted values stored in the conceptual understanding of a given piece of information are the ones with the most conceptually relevant terms for that stored conceptual understanding representation of the information. It is the combination of the above two theories that enable the intelligent platform's software to determine the most important, or informative, concepts within a document. Using the combination of 1) idea distancing, 2) Shannon's Information Theory to pick up the most important terms to gain a conceptual understanding of a document and understanding the hierarchical structure of an analyzed document itself to give a conceptual understanding of a content of a document (i.e. content found in a title and/or summary paragraph of a hierarchy of a document are given more weight than the content found in a body of a document), and 3) a Bayesian statistical modeling that refines assigned mathematical weights over time, all assist to build an accurate conceptual understanding representation of a document.

The intelligent data operating layer may use the above capabilities along with having programmed intelligence to recognize over 1,000 different file formats and securely connect to over 400 repositories to provide advanced and accurate retrieval of the valuable knowledge and business intelligence that already exists within any organization.

As illustrated in FIG. 2, connectors 200 may be used. For example, organizations can democratize data types with the intelligent platform's 400+ connectors, as well as new connectors for Social Content and big data with support for Facebook®, Twitter®, Hadoop®, and others. New functions for intelligent image and document recognition functions include document comparison for version management, signature identification, among other features, and can accommodate data extraction requirements from complex data sources such as contracts, forms, productivity tools, and spreadsheets. In addition, standard connectors and flexible APIs assist customers in moving data, creating reports, dashboards, and queries—and developing applications for improved query performance and scalability.

In some embodiments, relatively inexpensive commodity machines may be configured to run connectors 200, and a more expensive, reliable and higher performance Enterprise class platform may be configured to run the core servers.

Enterprises may have storage repositories organized by subject matter or department, for example, a database for sales, a database for finance, a database for legal, a database for news, a database for e-mails, and many more repositories of structured and unstructured data. The intelligent platform allows these databases from distinctly separate sources to work harmoniously as one shared storage of structured and unstructured data. From a single platform, companies can access and process any piece of data in any form, including unstructured data such as text, email, web, voice, or video files, regardless of its location or language. For example, language pipeline 204 might be configured to automatically recognize and understand videos, voice mails, and text documents and convert them into an understandable list of important text and phrases and images/symbols in that electronic file. The language pipeline 204 is discussed further with respect to FIG. 7.

In an embodiment, an intelligent data operation engine server consists of a server that is scalable, contains one or more processors to support multi-threaded processing on advanced pattern-matching technology that exploits high-performance probabilistic modeling techniques. In an embodiment, a first instance of the action handler is implemented in a distribution server configured to support and convey distributed protocol action commands to and between the two or more intelligent data operation engine servers, which assists a user in scaling the intelligence platform for the processing the large sets of both unstructured data of as well as structured data in a linear manner, increasing the speed with which actions are executed, and saving processing time.

The index processing pipeline contains one or more instances of the distributed index handler. The distributed index handler can efficiently split and index large quantities of data into multiple intelligent data operation engine server instances, optimizing performance by batching data, replicating index commands, and invoking dynamic load distribution. The distributed index handler can perform data-dependent operations, such as distributing the content by date, which allows for more efficient querying. The query pipeline 208 contains one or more instances of a distributed action handler. In some embodiments, the action handler is a distribution server that allows for the distribution of protocol action commands such as Autonomy Connection Information protocol action commands, to and between the multiple intelligent data operation engine servers, which assists to allow for scaling systems in a linear manner, increasing the speed with which actions are executed and saving processing time.

The action handler may be a distribution server that allows the user to distribute action commands, such as querying, to the two or more intelligent data operation engine servers in order to augment performance across the intelligent platform. The query pipeline and index processing pipeline cooperate to improve scalability and performance on big sets of data containing both structured and un-structured electronic files. The query pipeline and index processing pipeline cooperate with multiple copies of intelligent data operation engine servers to improve scalability and performance on large sets of data containing both structured and un-structured electronic files. The action handler propagates query actions to the two or more instances of intelligent data operation engine servers to search the index of content in the two or more repositories, which further ensures uninterrupted service in the event of server failure. The action handler uses the two or more instances of intelligent data operation engine servers as a pool of servers, a primary intelligent data operation engine server is automatically selected and the action handler switches to secondary intelligent data operation engine server when the primary intelligent data operation engine server fails so that service continues uninterrupted.

The intelligence platform may be selected/configured by the user on how to intelligently distribute work amongst the instances of intelligent data operation engine servers. For flexibility, both the action handler and the distributed index handler can be configured by the user to run in mirroring mode (intelligent data operation engine servers are exact copies of each other) and non-mirroring mode (each intelligent data operation engine server is configured differently and contains different data). Thus, the user is given an option of how to optimize the multiple instances of intelligent data operation engine servers to service their sets of repositories of stored electronic files and the expected volume of (i.e. amount of) queries the system is expected to process per a unit of time. In the 'non-mirroring mode', the system is optimized to handle a maximum expected volume of number/amount of queries per unit time. Each intelligent data operation engine server instance is processing its own given query and works through the analytics of finding relevant matching electronic files by itself independent of the other intelligent data operation engine server instances. Load balancing still occurs amongst the multiple instances but the handling of an individual query analysis and search result response is handled by a single intelligent data operating layer instance working on that individual query analysis.

In the 'mirroring mode', the system is optimized to handle fewer amounts of queries at a greater response time. All of the intelligent data operation engine server instances cooperate to work on different aspects and parts of handling of an individual query analysis and search result response for that query analysis. Thus the intelligence platform is 1) scalable to suit each user enterprise needs—handle massive amounts of queries per unit time or 2) handle fewer queries with less latency between the query and the search result response.

The distributed index handler increases performance of both the index processing pipeline and query pipeline by using database statistics and life cycle management to determine relevant electronic files and place them into the proper category for indexing, and then later for query optimization provides feedback while searching different repositories to determine the most relevant electronic files. This determination may occur by factoring both an amount of relevant documents returning to the key terms of the query, the strength or percentage relevance of those returned documents to the query, and tracked historic data of most relevant indexed categories to search for previous similar queries.

The action handler of the query pipeline analyzes the nature of a query when possible, for example, a query in the financial data base of an enterprise is most likely wanting financial related structured and unstructured data returned as search results and accordingly documents indexed in the financial category are searched first. Likewise, a query about news items would search for documents indexed in the current news category are searched first and lifecycle management tends to put older documents date wise out of that category and into a historical news category. The query pipeline increases performance by determining the most rare occurrence terms or noun phrases in the query search terms. Thus, the action handler of the query pipeline is configured to analyze a nature of a content of a query when possible and the query pipeline increases performance by determining the most rare occurrence terms or noun phrases in the query search terms.

The query pipeline analyzes a statistically most rare occurrence of terms or noun phrases present in the query search terms such that a nature of the query can determine a most relevant sub-portions of the common indexed structured data and unstructured data to begin the search in and send command actions to two or more intelligent data operation engine servers to focus a most amount of processing power in analyzing the electronic files in the storage repositories containing these relevant sub-portions. The query pipeline focuses the majority of total processing power of the distributed two or more intelligent data operation engine servers to find relevant electronic files most relevant towards the most rare occurrence terms, noun phrases, and/or term pairings, in the query search terms. The more common search terms tend to bring back a wider swath of documents that are not relevant that need to be analyzed. However, by starting the search response on the indexed structured data and unstructured data weighing heavily on the most rare occurrence terms, noun phrases, and/or term pairings tends to rapidly narrow the volume of potentially relevant documents/electronic files that need to be analyzed for determining a mathematical number of their relevance in relation to the query so a ranked list of relevant structured and unstructured data can be presented back as search results.

The intelligence platform keeps electronic files with the entirety of that file but inserts statistical weights for relevance to the conceptual understanding of that document into the tiers of term level, corpus level, and document level and then places the representation understanding of that electronic file into the appropriate category. The intelligence platform uses feedback when searching for matching content between structured and unstructured documents. In addition, the Distributed Service Handler (DiSH) component allows effective auditing, monitoring and alerting of all other the components in this distributed platform. In some embodiments, the DiSH may be used for a single point of control, monitoring and configuration of all of the components in this distributed platform.

In addition, the integration of the indexes for structured and unstructured data has been performed in a way that ensures maximum scalability. Techniques for storing structured data are well established as part of database systems, with more recent developments towards column-based storage allowing increasingly rapid evaluation of certain types of query. Rather than allowing separate "databases" to index the structured and unstructured data, intelligent data operation engine server has been designed to handle and store both types of data (i.e. structured and unstructured data) into a single system. This utilizes existing advances in structured data storage with the intelligent data operation engine server instances' statistical database technology, and combines them to allow an immediacy of interaction that is able to optimize queries that are evaluated against a corpus containing both structured and unstructured data simultaneously.

In the illustrated embodiment, all of the intelligent data operation engine server instances use a common protocol, such as Autonomy Connect Information (ACI) protocol, to talk to each other and present a common Application Programming Interface (API) 210.

In various embodiments of the systems and methods described herein, performance and capacity can be essentially doubled by replicating the existing machine coordinating their efforts. This allows scaling predictions to be made without worry about bottlenecks.

Some embodiments deliver linear scalability by use of its distribution model, which allows additional machines, locations and indexes to appear as one. In addition, an intelligent data operating layer may include distributed components that are uniquely 'Geo-efficient'. Geoefficiency permits completely fault tolerant national, trans-national and trans-global architectures to be assembled with ultimate flexibly in component placement. The intelligent data operating layer's distributed components distributed index handler and action handler form a coherent layer within the intelligent data operating layer. The distributed index handler and action handler components can be placed inline or within fully nested topologies. Heterogeneous hardware/OS and network environments are fully supported with both the action handler and distributed index handler able to act in isolation or cooperatively to intelligently process index and query traffic. The action handler and distributed index handler cooperating support distributed index and query commands as well as data payload that can automatically be scheduled, mirrored, throttled, queued, and recovered.

These systems and methods may support mirroring and fail over processes. For example, the action handler uses the two or more instances of intelligent data operation engine servers as a pool of servers. A primary intelligent data operation engine server is automatically selected and the action handler switches to secondary intelligent data operation engine server when the primary intelligent data operation engine server fails so that service continues uninterrupted.

The intelligent data operating layer's cooperation with the distributed index handler allows companies to cost-effectively outsource the storage and management of emails, electronic documents, rich media files, instant messages, and all forms of web content. The intelligent data operating layer's cooperation with the distributed index handler allows operation across for example, 25,000, production servers hosted in data centers located geographically around the world. The intelligent data operating layer's cooperation with the distributed index handler provides security and scalability in the cloud, adhering to global certification standards such as SAS 70 Type II, PCI DSS, US DOD 5015.02, UK TNA2002, and Australia's VERS. Two or more fully mirrored, geographically separate systems can provide complete data and system redundancy as well as parallel processing of all tasks.

The intelligent data operating layer's cooperation with the distributed action handler provides a high degree of reliability through fail-over mechanisms built into the distribution components. The action handler allows for example, 100%, uptime from a pair of two or more intelligent data operation engine servers, while the distributed index handler ensures data integrity across the pair of two or more intelligent data operation engine servers.

The Distributed Service Handler (DiSH) component is configured to support high availability deployments, so that administrators are alerted to potential faults or when maintenance may be required. The Distributed Service Handler (DiSH) component allows effective auditing, monitoring and alerting of all other intelligent platform components. The Distributed Service Handler can be used to alert to critical errors, sizing boundaries or extraordinary events, thereby automatically keeping administrators aware when there are problems, when the limits of the current system are close to being reached, and when unexpected events occur.

The illustrated server provides for instruction-level parallelism. An intelligent data operating layer server programmatically expresses itself as an expanding collection of operations. These operations can and are executed in serial pipeline form yet the inherent logic of simultaneously processing disparate forms of unstructured, semi-structured and structured data requires a high degree of parallelism. Not only does the intelligent data operating layer need to ingest multiple streams and types of data, the intelligent data operating layer must also provide a real-time answer or decision against that data as it is indexed rather than force the user to wait an arbitrary period until serially accessed resources becomes available. As a consequence, the intelligent data operating layer has been designed with instruction-level parallelism (ILP) as the core of its process and operation model. ILP by definition is limited by the serial instruction model of scalar processors and thus the intelligent platform uses forms of parallel architecture including multi-CPU, hyper-threading and now single die multi-core processing.

The intelligent data operating layer engine's default process model is multi-threaded (using a configurable number of threads). The intelligent data operating layer operations can either be grouped by class, with indexing and querying performed by separate threads or for n-core models a single operation can be "atomized" into multiple threads. Concurrent querying and indexing is the default with no requirement whatsoever for "locking" any part of the indexes while querying takes place. All major multi-core manufacturers are supported, including, for example, Intel, AMD and Niagara offerings from Sun Microsystems.

The intelligent platform may use multi-core strategies as a key to crossing the consumer "teraflop" threshold. The intelligent platform may use "coalition" simulations of split thread intelligent data operating layer operations against n-core "battalion" processor units that blend general-purpose cores with more specialist cores such as those dedicated to signal processing. These blended core units in the engine may be teraflop chips. The intelligent platform may use thread models that dynamically co-opt different core types to act in "coalition" to perform the simultaneous deconstruction and analysis of unstructured sources such as video that combine visual and auditory attributes.

The system illustrated in FIG. 1 can be scaled for increased performance. An embodiment scales to support the largest enterprise-wide and portal deployments in the world, with presence in virtually every vertical market. Since these systems and methods scalability is based on its modular architecture, it can handle massive amounts of data on commodity dual-CPU servers. An embodiment of the intelligent data operating layer delivers linear scalability through a multi-threaded, multi-instance approach with load-balancing to intelligently distribute the indexing and query workload.

Intelligent Data Operating Layer (IDOL) Server

Figure 3:
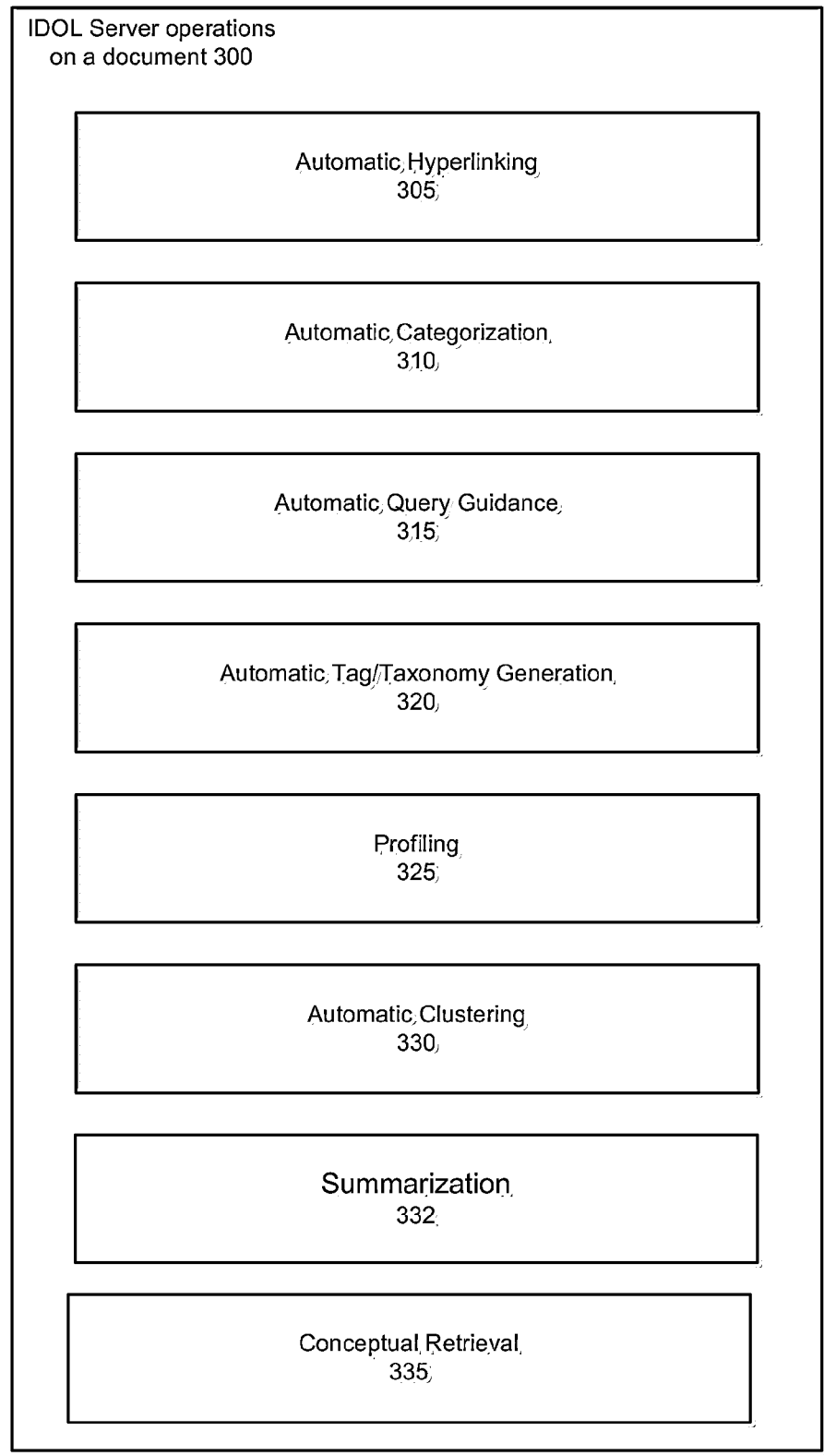
FIG. 3 illustrates an example block diagram of an embodiment of some modules of an intelligent data operation engine server.

FIG. 3 illustrates an example block diagram of some modules of an intelligent data operation engine server, in accordance with some embodiments. Intelligent data operation engine server 300 may include automatic hyperlinking module 305, automatic categorization module 310, automatic query guidance module 315, automatic taxonomy generation module 320, profiling module 325, automatic clustering module 330, and conceptual retrieval module 335. The automatic hyperlinking module 305 is configured to allow manual and fully automatic linking between related pieces of information. The hyperlinks are generated in real-time at the moment the document is viewed. The automatic categorization module 310 is configured to allow deriving precise categories through concepts found within unstructured text, ensuring that all data is classified in the correct context.

The automatic query guidance module 315 is configured to provide query suggestions to find most relevant information. The automatic query guidance module 315 identifies the different meanings of a term by dynamically clustering the results into their most relevant groupings. The automatic taxonomy generation module 320 is configured to automatically generate taxonomies, such as an XML schema, and instantly organizes the data into a familiar child/parent taxonomical structure. The automatic taxonomy generation module 320 identifies names and creates each node based on an understanding of the concepts with the data set as a whole. The profiling module 325 is configured to accurately understand individual's interests based on their browsing, content consumption and content contribution. The profiling module 325 generates a multifaceted conceptual profile of each user based on both explicit and implicit profiles.

The automatic clustering module 330 is configured to help analyze large sets of documents and user profiles and automatically identify inherent themes or information clusters. The automatic clustering module 330 even clusters unstructured content exchanged in emails, telephone conversations and instant messages. The conceptual retrieval module 335 is configured to recognize patterns using a scalable technology that recognizes concepts and find information based on words that may not be located in the documents. It should be noted that the intelligent data operation engine server 300 may also include other modules and features that enable it to work with enterprise facilities.

Figure 4:
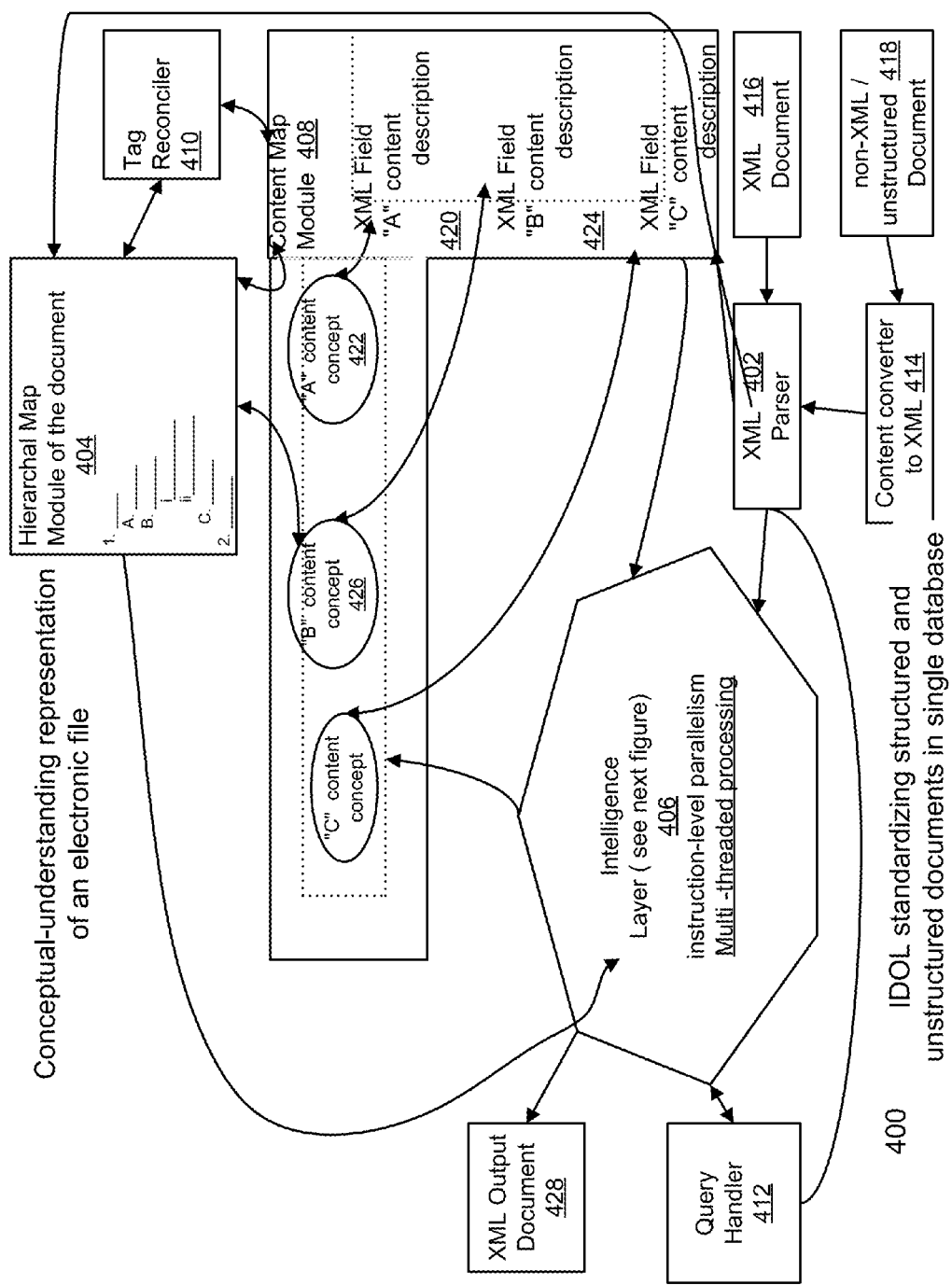
FIG. 4 illustrates an example block diagram of an embodiment of an intelligent data operation engine server generating a conceptual representation of an electronic file.

FIG. 4 illustrates an example block diagram of an embodiment of an intelligent data operation engine server generating a conceptual representation of an electronic file. The creation of a conceptual representation of an electronic file not only extracts key text and metadata to assist in categorization of and taxonomy generation for the electronic file and also matching to relevant queries, but also preserves and intelligently processes all content, intelligence and metadata relationships that reside within the electronic file. The information powering today's organizations exists in two forms: structured and unstructured. The structured data requires humans to adapt the information to fit a format needed by machines. Manual classification augments structured information with the nuances and complexity that computers could not grasp, because people do not speak in zeroes and ones. The nature of human communication is complex, using language and idioms, photographs and videos, recordings and social media interactions. Human information is unstructured and does not fit into the neat rows and columns of relational databases. Yet, unstructured content from the web and other sources represents the fastest growing segment of the world's content. An intelligent data operation engine server allows organizations to eliminate the inefficiencies of the manual issues associated with creating XML tags by understanding the content and purpose of either the tag itself, related information, or both.

The index processing pipeline develops a conceptual understanding of structured and unstructured electronic files, assigns statistical weights to the terms, noun phrases, etc. making up the electronic file indicating the relevance of those terms, noun phrases, etc. to the overall understanding of that electronic file. Those weights on a term level, corpus level, and document level are then associated with that electronic file as well as indexed into one or more categories that the electronic file primarily falls into, for example, categories determined by subject matter, categories determined by age, categories determined by human language the electronic file is spoken and/or written in. Electronic document files can be text files, e-mails, electronic files, video files, audio files, instant messages, etc.

In an embodiment, the intelligent data operating layer natively indexes all documents directly into XML into the engine and assigns XML tags into the conceptual understanding representation of that document while maintaining any original XML tags. This allows interoperability between applications that use different XML tagging rules because the original XML tags are still there while the inserted XML tags help to connect the dots between any two XML tag structures. With the documents original XML tags and the natively indexed tags inserted all documents of all types, structured and unstructured, can be stored in single type of database. However since the common XML tags have been inserted into the conceptual understanding of all types of electronic files, from a single platform, companies can access and process any piece data in any form, including unstructured data such as text, email, web, voice, or video files, regardless of its location, format of the unstructured document, or human language.

For example, block 402 is an XML parser. An XML electronic file 416 can be an input to the XML parser 402. Alternatively, a non-XML electronic file 418 can be converted to XML 414 and provide an input to XML parser 402. The XML parser can then parse the converted electronic file (which is XML) or the XML electronic file 416 for input to the intelligent layer 406.

The embodiment illustrated in FIG. 4 includes a hierarchal map module of the document 404 that generates a hierarchal map of each electronic file. Generally, the module 404 outlines the electronic file to capture a conceptual understanding of the document. For example, the intelligent layer can determine various concepts 422, 426 from the content map 408, which can include XML fields for various content of the document such as "A" content description 420, "B" content description 424, etc. These contents 420, 424 can then provide the concepts 422, 426 for the hierarchal map. Tag reconciler 410 can reconcile tags for the content descriptions between the content map module 408 and the hierarchal map module of the document. The content map module 408 also tries to place similar concepts close to each other to take advantage of idea distancing. In this example way, the intelligent data operation engine server can generate a conceptual representation of an electronic file.

The classification portion identifies concepts in the data in an electronic file, and series of electronic files, and uses them to build clusters of related information. Taxonomy generation builds a hierarchical structure, from both these clusters and/or from the results of a query to the IDOL engine over time, which aids in the directory structure and category hierarchy. The category hierarchy contains categories that classification portion builds from concepts identified by a user and/or imported by taxonomy generation.

In the illustrated embodiment, query handler 412 can receive user queries and provide input to the intelligence layer 406. In this way, a user can perform a search using the systems and methods described herein. Based on the search results the intelligent layer 406 can provide XML output document 428 to the user based on the query 412.

Figure 5A:
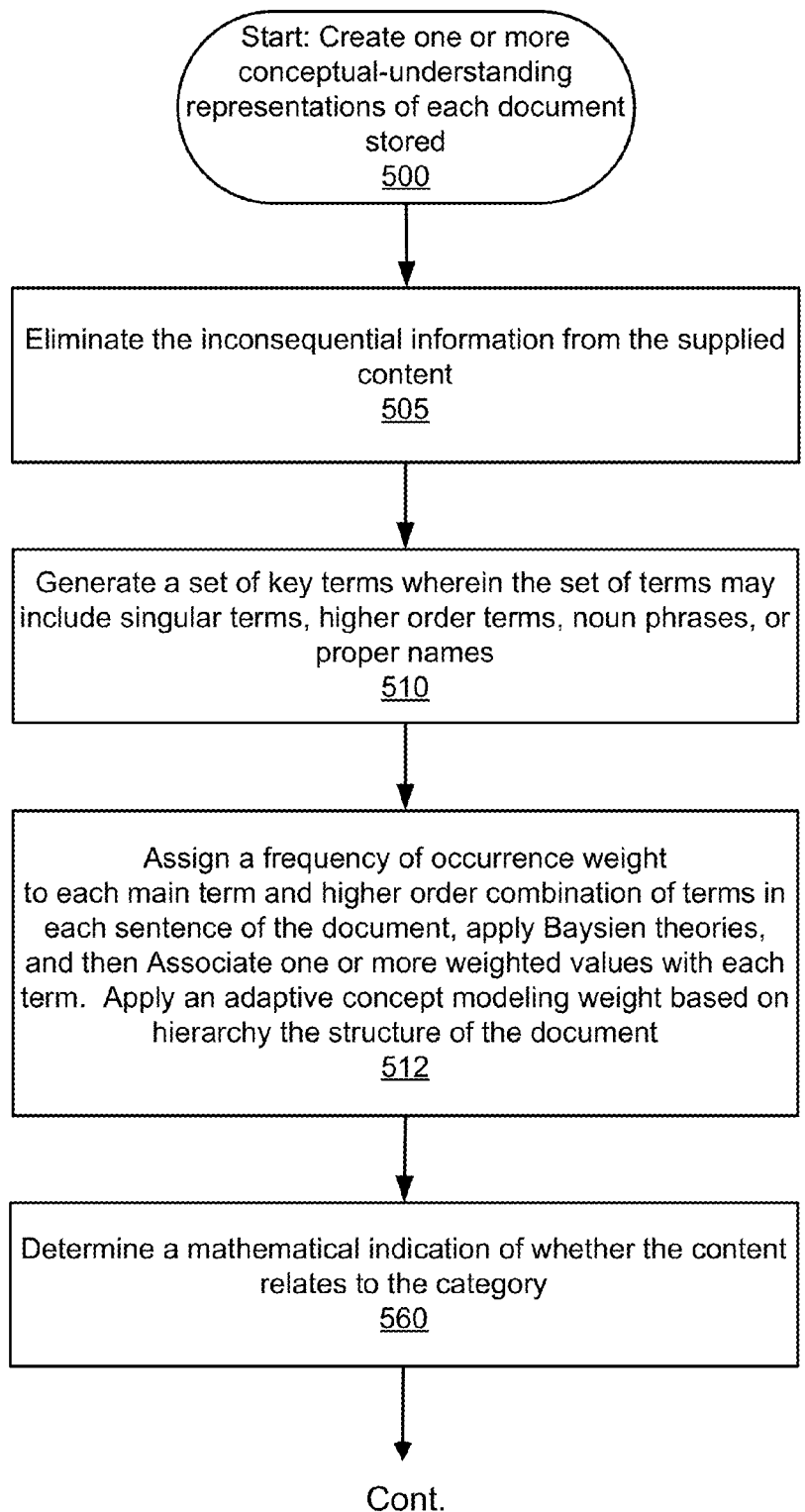
FIGS. 5A-5B illustrates an example flow diagram of a process to create one or more conceptual understandings/representations of electronic files.
Figure 5B:
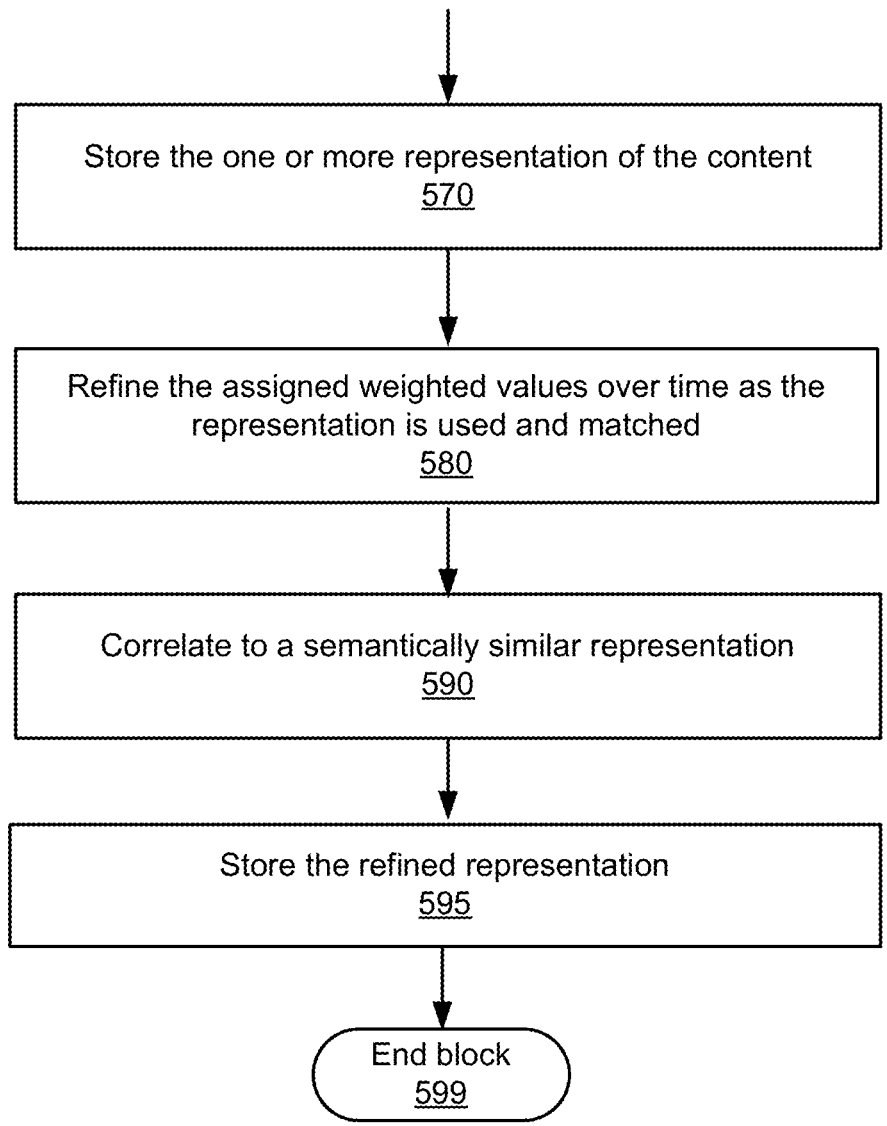

More details with respect to the intelligent layer 406 are discussed with respect to FIGS. 5A and 5B. The intelligent layer 406 can take advantage of instruction-level parallelism and multi-threaded processing.

Instruction-Level Parallelism

An example system may programmatically express itself as an expanding collection of operations. These operations can and are executed in serial pipeline form yet the inherent logic of simultaneously processing disparate forms of unstructured, semi-structured and structured data may be amenable to a high degree of parallelism. Not only is an example system capable of ingesting multiple streams and types of data, it may also provide a real-time answer or decision against that data as it is indexed rather than force the user to wait an arbitrary period until serially accessed resources become available.

As a consequence, the intelligent data operating layer may be designed with instruction-level parallelism (ILP) as part of its process and operation model. ILP by definition is limited by the serial instruction model of scalar processors; and thus, the intelligent platform may use all forms of parallel architecture from multi-CPU, hyper-threading, and/or single die multi-core processing.

The engine's default process model may be multi-threaded (using a configurable number of threads). An example system can include operations that can either be grouped by class, with indexing and querying performed by separate threads for n-core models a single operation can be "atomized" into multiple threads. Concurrent querying and indexing is the default with no requirement whatsoever for "locking" any part of the indexes while querying takes place. The servers use many multi-core hardware parts and multiple threaded techniques.

FIGS. 5A-5B illustrate an example flow diagram of a process to create one or more conceptual understandings/representations of each electronic file. In step 500, the example method creates one or more conceptual-understanding representations of each electronic file stored by the following steps. The index processing pipeline develops a conceptual understanding of both structured data and unstructured data electronic files.

In step 505, inconsequential information from the supplied content is eliminated. For example, information not used for indexing or for the conceptual understanding of structured and unstructured electronic files may be eliminated. Typically, each human language has many very common words that add little to conceptual understanding of the document such as 'the', 'a', 'an', 'and', many verbs, etc. A filter containing this list of words may eliminate these inconsequential words from the content of the electronic file.

In step 510, a set of key terms is determined. The set of terms may include singular terms, higher order terms, noun phrases, or proper names. For example, when the index processing pipeline develops a conceptual understanding of structured and unstructured electronic files it can assign statistical weights to the terms, noun phrases, etc. making up the electronic file indicating the relevance of those terms, noun phrases, etc. to the overall understanding of that electronic file. Those weights on a term level, corpus level, and document level are then associated with that electronic file as well as indexed into one or more categories that the electronic file primarily falls into, for example, categories determined by subject matter, categories determined by age, categories determined by human language the electronic file is spoken and/or written in. Electronic files can be text files, e-mails, electronic files, video files, audio files, instant messages, etc. A number of factors affect an assigned weight such as the number of times a word occurs in the electronic file and the word's position if a hierarchical structure exists in the electronic file. For example, words in a title and/or abstract paragraph are assigned a higher weight than those merely found in the body of the document.

In step 512, a frequency of occurrence weight is assigned to each main term and higher order combination of terms in each sentence of the document, apply Bayesian theories and then associate one or more weighted values with each term. Apply an adaptive concept modeling weight based on hierarchy the structure of the document.

In step 560, a mathematical indication of whether the content relates to the category is determined. This can be based on the key terms (step 510) and the frequency of occurrence weight assigned (step 512). Further, this is refined when people's search query terms are analyzed each time this document is selected by a user. The electronic file is moved closer to categories corresponding to the people's search query terms who have selected that electronic file as a relevant document to the search query.

In step 570, the one or more conceptual representations of the content in the electronic file are stored. For example, the conceptual representation may be stored on a server such as those illustrated in FIG. 1.

In step 580, the assigned weighted values over time as the conceptual representation is used and matched are stored. For example, an embodiment can assign both mathematical weights and positioning in different categories to give an ability to understand information that discusses the same idea (i.e. are relevant) but use semantically different words.

In step 590, the example method correlates to a semantically similar representation. An example embodiment can use idea distancing (vital relationship between seemingly separately tagged subjects) to increase findability of information. Similar subject matters are placed close to each other in the logical space of the relational database. All animal types, such as lions, tigers, and bears, will be placed close to each other under the umbrella of animal. Although lions, tigers, and bears are different sub-categories but are closely related in idea distance.

In step 595, the refined conceptual representation over time is stored. For example, an embodiment can use Information Theory to ensure the terms having weighted values are the most conceptually relevant terms for that stored conceptual understanding representation of the document. The process ends at end block 599.

Figure 6:
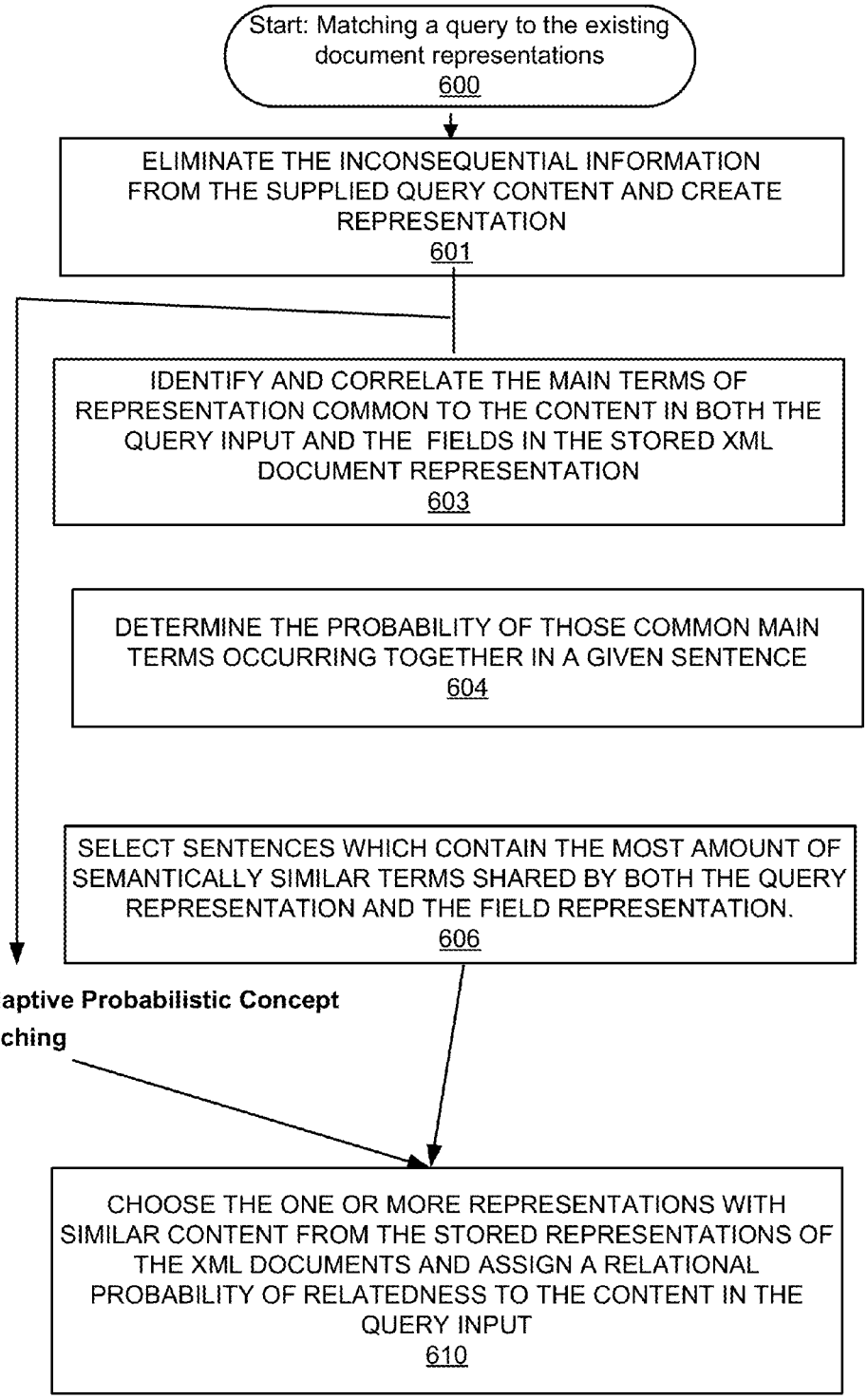
FIG. 6 illustrates an example flow diagram of an embodiment of a process.

FIG. 6 illustrates an example flow diagram of a process in the query pipeline to match a query to the existing document representations.

In step 601, the example method eliminates the inconsequential information from the supplied query content and creates a conceptual representation of the supplied query content. After step 601, the example method may perform adaptive probabilistic concept caching. In the adaptive probabilistic concept, caching frequently-used concepts are maintained in memory and query results are returned as quickly and efficiently as possible. Two of the key factors in any deployment are query and index performance. The intelligent platform's Adaptive Probabilistic Concept Caching algorithm ensures that frequently used concepts are maintained in memory caches and that query results are returned as quickly and efficiently as possible. The intelligent platform also uses multi-tier caching, ensuring that the minimum number of operations is performed to provide the functionality required. Intelligent Advanced Probabilistic Conceptual Multi-Tier (APCMT) caching is used in multiple parts of the information processing pipeline to ensure the most efficient response is given from the most efficient component as quickly as possible. This also ensures that the individual pieces of information that can be cached are cached, and that information that is time critical and cannot be cached can be excluded from the scheme.

In step 603, the example method identifies and correlates the main terms of conceptual representations common to the content in both the query input and the fields in the stored XML document representation. Both the documents original XML tags and the natively indexed tags inserted in all documents of all types, structured and unstructured can be stored in single type of database and this helps to correlate main terms.

In step 604, the example method determines the probability of those common main terms occurring together in a given sentence. For example, an embodiment can use statistical probability modeling to calculate the probabilistic relationships between terms and phrases. The model of the conceptual understanding then improves over time to be more accurate the view of the conceptual meaning of a document based applying each new use of that conceptual understanding to affect the weighted values on the stored data.

In step 606, the example method selects sentences that contain the largest amount of semantically similar terms shared by both the query representation and the field representation.

In step 610, the example method chooses the one or more representations with similar content from the stored representations of the XML documents and assign a relational probability of relatedness to the content in the query input.

Figure 7:
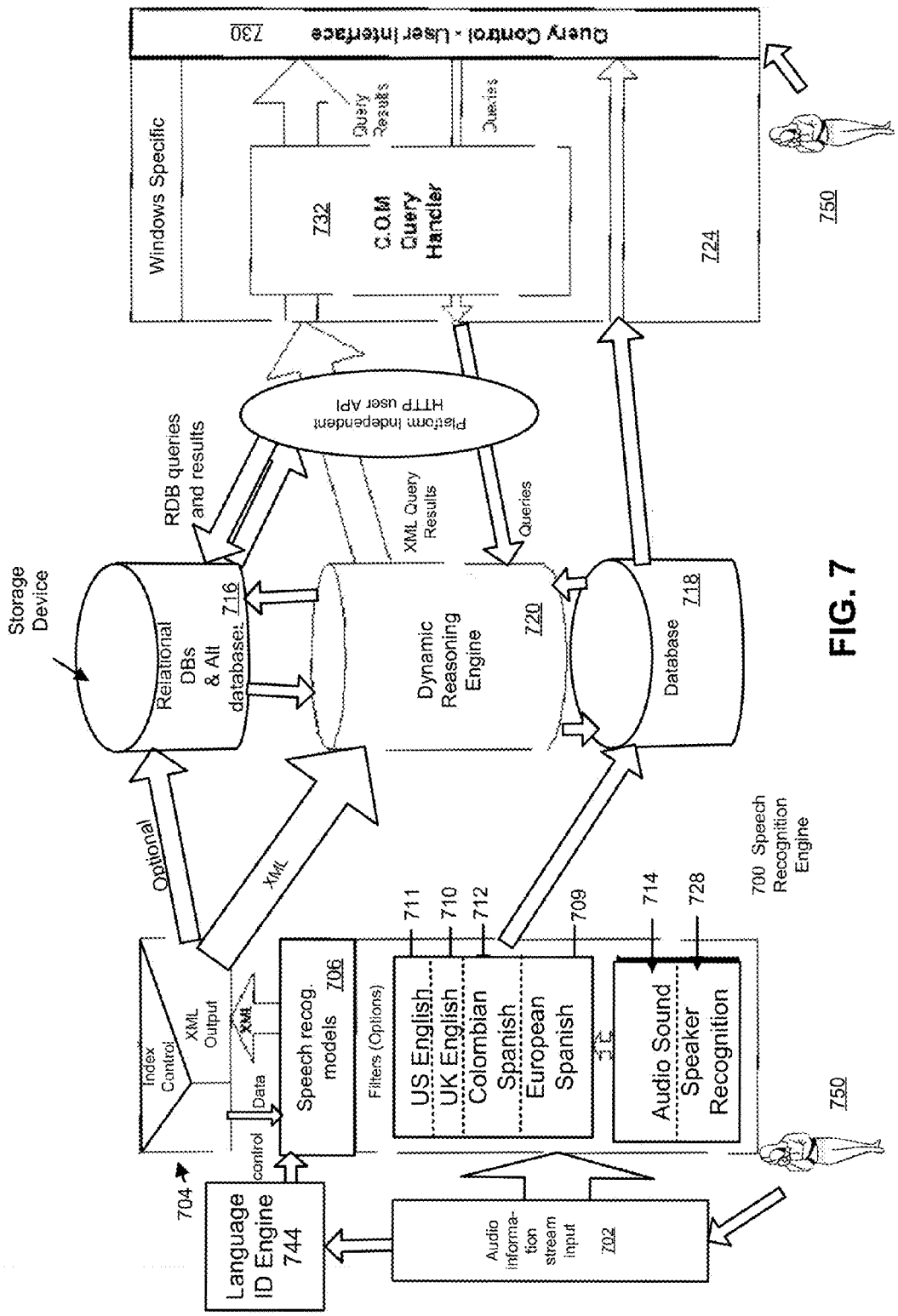
FIG. 7 illustrates an example block diagram of an embodiment of an intelligent data operation engine with a speech recognition engine portion.

FIG. 7 illustrates an example block diagram of an embodiment of an intelligent data operation engine with a speech recognition engine portion.

As illustrated in the example block diagram, an audio information stream 702 can be input to the example system, for example, by a person 750 talking on a mobile electronic device, a pod cast on the Internet, radio and television shows, etc. or some other form of unstructured data.

The audio information stream input 702 can be identified using language identification engine 744 and speech recognition models 706. The speech recognition models 706 can include filters to differentiate between, for example, U.S. English 711, U.K. English 710, Columbian Spanish 712, and European Spanish 709, to name a few examples. Additionally, speech recognition models 706 can be used to determine if the input 702 is audio sound 714 and for speaker recognition 728 to allow for further audio information stream input 702 processing as the systems and methods described herein are not limited to audio information. Rather these systems and methods may be used in conjunction with both unstructured data of all varieties, such as video, audio, social media, email, text, click streams, log files, and web-related content and search results, as well as structured data.

Speech recognition models 706 can be controlled by index control 704 to output XML based on the audio information stream input 702. This XML output can then be processed using the systems and methods described herein. For example, the XML output can be directed to a storage device such as relational databases and alternative databases 716. The XML output can also be directed to the intelligence engine 720 for processing in accordance with the systems and methods described herein.

An example information platform can include a single processing layer that enables organizations to extract meaning and act on all forms of information, including audio, video, social media, email and web content, as well as structured data such as customer transaction logs and machine-based sensor data. The platform combines intelligence engine's 720 infrastructure software for automatically processing and understanding unstructured data with the high-performance, real-time analytics engine for extreme structured data. A single processing layer provides for conceptual, contextual, real-time understanding of all data, inside and outside an enterprise.

The intelligence engine 720 pattern-matching powered by statistical algorithms to assign weights to a set of terms, corpus, and document level tiers and then indexes these conceptual understandings/representations of an electronic file and forms clusters of all of the electronic files that convey a similar concept based on the form conceptual understanding of the electronic file into a particular category so the intelligence engine 720 can also recognize distance in ideas and concepts and does this in near real time. Manage-in-Place technology indexes all data where it resides eliminating copying requirements, storage costs, and hand-off risks, for example, by interfacing with databases 718. A NoSQL interface provides single processing layer for cross-channel analytics of structured and unstructured data. The intelligence engine 720 uses performance enhancements for the Analytics Platform including sub-queries, database statistics, life cycle management to determine relevant electronic file, query optimization, data re-segmentation, and join filtering.

The systems and methods described herein can include a language pipeline, configured to automatically recognize and understand videos, voice mails, and text documents and convert them into an understandable list of important text, phrases and images/symbols in that electronic file.

All of the intelligence engines 720 (Intelligent data operation engine server instances) use a common protocol to talk to each other such as Autonomy Connect Information Application Programming Interface.

As illustrated in FIG. 7, an example system may process queries provided by user 750 to an example Windows specific system 724 through query control user interface 730. The queries can be directed through C.O.M. query handler 732 and the platform independent HTTP user API to the intelligence engine 720 and to the relational databases and alternative databases 716. Based on the query a response may be routed from database 718, intelligence engine 720 or relational databases and alternative databases 716 through the query control user interface 730 back to user 750.

The system illustrated in FIG. 7 can include mapped security. Generally, the biggest single constraint on scalability within enterprise applications can be the ability to manage entitlement checks in a scalable manner. An example intelligent data operating layer stores security information in its native form directly in the kernel of the engine itself, with automatic updates to keep the security data current. This sharply contrasts with other security models that store security information in the original repositories, requiring communication between the search engine and the underlying repository for every potential result at the time of query.

An embodiment allows scaling without impeding performance, including search each document in its entirety. This allows users to retrieve valuable information from every part of the document/video file/audio file/database.

In an embodiment, scaling can be performed by indexing documents such that they may be searched and located and then queuing appropriate material based on searching the index. The structured data and unstructured data in the different storage repositories is indexed and organized within that single common index. Each conceptual understanding/representation of an electronic file has pointers to the actual stored structured data and unstructured data.

The systems and methods described can provide for conceptual retrieval—built on an innovative pattern-recognition technology, the intelligent data operating layer offers higher degrees of accuracy and sophistication using scalable technology that recognizes concepts rather than simply relying on words in the document.

From a single platform, companies can access and process any piece data in any form, including unstructured data such as text, email, web, voice, or video files, regardless of its location or language.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, Java, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled with a computer system bus. Portions of any modules or components described herein may be implemented in lines of code in software, configured electronic circuits, or a combination of both, and the portions implemented in software are tangibly stored on a non-transitory computer readable medium, which stores instructions in an executable format by a processor.

The algorithms and displays presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description below.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims. For example, specific examples are provided for shapes and materials; however, embodiments include those variations obvious to a person skilled in the art, such as changing a shape or combining materials together. Further, while some specific embodiments of the disclosure have been shown, the disclosure is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. A processor may be a central processing unit, a multiple core and multiple threaded processor, a digital signal processor, and other similar component configured to interpret and execute instructions. The disclosure is to be understood as not limited by the specific embodiments described herein, but only by scope of the appended claims.

What is claimed is:

1. A system comprising:
an index handler;
data servers configured for distributed processing of structured and unstructured data,
where a first of the data servers is configured to:
use a statistical algorithm to assign weights to terms found in content of electronic files,
use idea distancing between similar concepts to find different words in the electronic files that describe a same idea, form a conceptual understanding of content in each of the electronic files using the statistical algorithm and the idea distancing, and cooperate with the index handler to form a common index of the conceptual understanding of each of the electronic files, where the common index includes at least a conceptual understanding of a first of the electronic files that contains structured data and a conceptual understanding of a second of the electronic files that contains unstructured data, and a query pipeline that includes an action handler that is configured to support a distribution of command actions in a common protocol to the data servers, wherein the data servers are configurable to selectively run in one of a mirror mode and a non-mirror mode, wherein the data servers in the mirror mode have a same configuration and contain same data, and wherein the data servers in the non-mirror mode are configured differently and contain different data, and wherein the index handler is configurable to selectively run in one of the mirror mode and the non-mirror mode, and wherein the index handler in the mirror mode is configured to distribute same index data of the common index to the data servers, and the index handler in the non-mirror mode is configured to distribute different portions of the common index to the corresponding data servers.

2. The system of claim 1, wherein a first instance of the action handler is implemented in a distribution server configured to support and convey distribution of the command actions in the common protocol both to and between the data servers.

3. The system of claim 1, wherein the first data server is configured to use the idea distancing to form clusters of the electronic files, each of the clusters conveying a similar concept based on the formed conceptual understanding of the electronic files in the respective cluster fitting into a respective category.

4. The system of claim 1, wherein the index handler is configured to split and index data into the data servers, optimize performance by batching data for each data server to process, and replicate index commands between the data servers.

5. The system of claim 1, wherein the query pipeline is configured to analyze a statistically most rare occurrence of a term present in search terms of the query, and to determine, based on the analyzing, a most relevant portion of structured data and unstructured data to begin a for the query.

6. The system of claim 1, wherein the query pipeline is configured to focus a majority of total processing power of the data servers to find electronic files most relevant towards a term in the query that has a most rare occurrence, and wherein the query pipeline is configured to start a search in response to the query that is weighted more heavily on the term having the most rare occurrence.

7. The system of claim 1, further comprising:
repositories storing the electronic files that are organized by subject matter, and wherein the repositories include both repositories for the structured data and repositories for the unstructured data, and wherein the conceptual understandings are represented in an XML format.

8. The system of claim 1, wherein the first data server includes an executable dynamic reasoning engine that is configured to interact with one or more processors implementing multi-threaded processes of the first data server to generate the conceptual understandings of the electronic files, and execute queries on the electronic files.

9. The system of claim 1, wherein conceptual understandings of the electronic files are indexed and organized within the common index, and each conceptual understanding within the common index has one or more pointers to the respective electronic file.

10. The system of claim 1, wherein the action handler is further configured to propagate query actions to the data servers to search the common index, where the action handler is further configured to:
use the data servers as a pool of servers,
automatically select a primary data server in the pool, and switch to a secondary data server in the pool when the primary data server fails.

11. The system of claim 1, wherein the system increases performance of both the index handler and the query pipeline by using database statistics and life cycle management to determine relevant electronic files and to place the relevant electronic files into respective categories for indexing.

12. The system of claim 11, wherein the first data server is configured to make a determination of which electronic files are most relevant by considering an amount of relevant documents returning to key terms of a query, a strength rating or percentage relevance of those returned documents to the query, and tracked historic data of a most relevant indexed categories to search for previous similar queries.

13. The system of claim 1, where the action handler is configured to distribute the command actions when a lack of feedback from a particular data server occurs to ensure uninterrupted service when any of the data servers should fail.

14. The system of claim 1, wherein the first data server is configured to perform adaptive probabilistic concept caching in which frequently-used concepts are maintained in a memory of the first data server and query results are returned using the frequently-used concepts maintained in the memory.

15. The system of claim 1, wherein the first data server is configured to form the conceptual understanding of a given electronic file by:
eliminating inconsequential information from a content in the given electronic file;
generating a set of key terms, wherein the set of key terms include one or more of singular terms, higher order terms, noun phrases, proper names, and any combination of these; and
assigning a frequency of occurrence weight to each of the key terms.

16. A method comprising:
assigning weights to terms found in content of electronic files;
using idea distancing between similar concepts to find different words in the electronic files that describe a same idea;
using both the assigned weights and the idea distancing to form a conceptual understanding of the content in each of the electronic files;
cooperating with an index handler to form a common index of the conceptual understanding of each of the electronic files, where the common index includes at least a conceptual understanding of a first of the electronic files that contains structured data and a conceptual understanding of a second of the electronic files that contains unstructured data;
distributing, by a query pipeline, command actions in a common protocol to data servers;
selectively configuring the data servers to selectively run in one of a mirror mode and a non-mirror mode, wherein the data servers in the mirror mode have a same configuration and contain same data, and wherein the data servers in the non-mirror mode are configured differently and contain different data; and selectively configuring the index handler to selectively run in one of the mirror mode and the non-mirror mode, wherein the index handler in the mirror mode is configured to distribute same index data of the common index to the data servers, and the index handler in the non-mirror mode is configured to distribute different portions of the common index to corresponding data servers.

17. The system of claim 1, wherein the data servers are configured to run in the mirror mode and the index handler is configured to run in the mirror mode for processing queries under a first condition, and wherein the data servers are configured to run in the non-mirror mode and the index handler is configured to run in the non-mirror mode for processing queries under a second condition.

18. The method of claim 16, wherein the data servers are configured to run in the mirror mode and the index handler is configured to run in the mirror mode for processing queries under a first condition, and wherein the data servers are configured to run in the non-mirror mode and the index handler is configured to run in the non-mirror mode for processing queries under a second condition.

19. A non-transitory computer-readable storage medium storing instructions that upon execution cause a system to:

assign weights to terms found in content of electronic files;

use idea distancing between similar concepts to find different words in the electronic files that describe a same idea;

form a conceptual understanding of the content in each of the electronic files using both the assigned weights and the idea distancing;

cooperate with an index handler to form a common index of the conceptual understanding of each of the electronic files, where the common index includes at least a conceptual understanding of a first of the electronic files that contains structured data and a conceptual understanding of a second of the electronic files that contains unstructured data;

distribute, by a query pipeline, command actions in a common protocol to data servers;

selectively configure the data servers to selectively run in one of a mirror mode and a non-mirror mode, wherein the data servers in the mirror mode have a same configuration and contain same data, and wherein the data servers in the non-mirror mode are configured differently and contain different data; and selectively configure the index handler to selectively run in one of the mirror mode and the non-mirror mode, wherein the index handler in the mirror mode is configured to distribute same index data of the common index to the data servers, and the index handler in the non-mirror mode is configured to distribute different portions of the common index to corresponding data servers.

20. The non-transitory computer-readable storage medium of claim 19, wherein the data servers are configured to run in the mirror mode and the index handler is configured to run in the mirror mode for processing queries under a first condition, and wherein the data servers are configured to run in the non-mirror mode and the index handler is configured to run in the non-mirror mode for processing queries under a second condition.

\* \* \* \* \*